(12) United States Patent
Fernandes

(10) Patent No.: US 8,208,554 B2
(45) Date of Patent: Jun. 26, 2012

(54) LINE-BASED VIDEO COMPRESSION

(75) Inventor: Felix C. Fernandes, Plano, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1235 days.

(21) Appl. No.: 11/952,808

(22) Filed: Dec. 7, 2007

(65) Prior Publication Data

US 2008/0137738 A1 Jun. 12, 2008

Related U.S. Application Data

(60) Provisional application No. 60/869,071, filed on Dec. 7, 2006.

(51) Int. Cl.
*H04N 11/02* (2006.01)

(52) U.S. Cl. .................... 375/240.19; 382/240; 382/251

(58) Field of Classification Search .................... None
See application file for complete search history.

(56) References Cited

U.S. PATENT DOCUMENTS

| | | | |
|---|---|---|---|
| 5,193,003 A | | 3/1993 | Kondo |
| 6,215,907 B1 * | | 4/2001 | Kumar et al. ................. 382/240 |
| 6,233,355 B1 | | 5/2001 | Kajiwara |
| 6,256,350 B1 * | | 7/2001 | Bishay et al. ............ 375/240.21 |
| 6,356,662 B1 * | | 3/2002 | Tsai ............................... 382/234 |
| 6,445,418 B1 * | | 9/2002 | Oh et al. .................. 375/240.01 |
| 6,973,127 B1 | | 12/2005 | Kolesnik et al. |
| 7,023,915 B2 | | 4/2006 | Pian et al. |
| 7,065,252 B1 * | | 6/2006 | Malvar et al. ................. 382/232 |
| 7,477,789 B2 * | | 1/2009 | Chao et al. .................... 382/232 |
| 2002/0143556 A1 | | 10/2002 | Kadatch |
| 2005/0100219 A1 | | 5/2005 | Berkner et al. |
| 2006/0053004 A1 | | 3/2006 | Ceperkovic et al. |
| 2006/0088096 A1 | | 4/2006 | Han et al. |
| 2006/0153291 A1 | | 7/2006 | Christison |
| 2008/0137737 A1 | | 6/2008 | Fernandes |
| 2008/0137738 A1 | | 6/2008 | Fernandes |

FOREIGN PATENT DOCUMENTS

CN 1251425 A 4/2000
(Continued)

OTHER PUBLICATIONS

Patent Cooperation Treaty International Search Report and Written Opinion of the International Searching Authority for Application No. PCT/US2007/086811, mailed May 1, 2008, 10 pages.

(Continued)

*Primary Examiner* — Donald Mills
(74) *Attorney, Agent, or Firm* — Nicholas J. Pauley; Peter M. Kamarchik; Jonathan T. Velasco

(57) ABSTRACT

A method for line-based video rate control is provided. The line based video rate control method includes system feedback to change system operating parameters, including on a packet-by-packet basis and also on a line-by-line basis. Also provided is a method for line-based compression. The method includes basic elements of an arithmetic coder to improve Golomb coding performance. By inverting operations in the method for line-based compression, the corresponding decoder can be obtained. The method also provides a heuristic-driven method for generating prediction residuals from quantized data, wherein prediction is driven in the direction of maximum correlation so that it is unnecessary to supply the decoder with additional data specifying this direction at each array element.

21 Claims, 26 Drawing Sheets

FOREIGN PATENT DOCUMENTS

| | | |
|---|---|---|
| CN | 1251725 A | 4/2000 |
| JP | 3074986 A | 3/1991 |
| JP | 10336682 A | 12/1998 |
| JP | 2001501783 A | 2/2001 |
| KR | 20020008133 | 1/2002 |
| KR | 20020064803 | 8/2002 |
| WO | WO9735427 A1 | 9/1997 |
| WO | WO9817065 | 4/1998 |

OTHER PUBLICATIONS

Sandberg, "The Daubechies Wavelet Transform", Department of Applied Mathematics, University of Colorado at Boulder (online), Apr. 14, 2000, http://amath.colorado.edu/courses/4720/2000Spr/Labs/DB/db.html, 3 pages.

Chrysafis et al., "Line-Based, Reduced Memory, Wavelet Image Compression", IEEE Transactions on Image Processing, vol. 9, No. 3, Mar. 2000, pp. 378-389.

Ordentlich et al., "Memory Efficient Scalable Line-Based Image Coding", Hewlett-Packard Laboratories (online), Jan. 1999, http://www.hpl.hp.com/techreports/1999/HPL-1999-1.pdf, pp. 1-11.

Felix Fernandes, U.S. Appl. No. 11/952,788, filed Dec. 7, 2007, for "Line-Based Video Rate Control".

E. P. Simoncelli et al., "Noise Removal via Bayesian Wavelet Coring", Proceedings of 3rd IEEE International Conference on Image Processing, vol. 1, Sep. 1996, pp. 379-382.

A. Kiely, et al., "Generalized Golomb Codes and Adaptive Coding of Wavelet-Transformed Image Subbands", IPN PR 42-154, Jet Propulsion Laboratory, California Institute of Technology, Apr.-Jun. 2003, Aug. 15, 2003, pp. 1-14.

G. J. Sullivan, "Rate Distortion Optimization for Video Compression", IEEE Signal Processing Magazine, 15(6):74-90, Nov. 1998.

T. Wiegand, "Rate-Constrained Coder Control and Comparison of Video-Coding Standards", IEEE Transactions on Circuits and Systems for Video technology, vol. 13, pp. 688-703, Jul. 2003.

S. Barua et al., "Optimal Quantized Lifting Coefficients for the 9/7 Wavelet", Proceedings of the 2004 IEEE International Conference on Acoustics, Speech and Signal Processing.

J. Reichel, et al., "Scalable Video Model Version 3.0", International Organizational for Standardization ISO/IEC JTC 1/SC 29 WG 11 N6716, Coding of Moving Pictures and Audio, Oct. 2004, Palma de Mallorca, Spain.

J. Teuhola, "A Compression Method for Clustered Bit-Vectors", Information Processing Letters, vol. 7, Oct. 1978, pp. 308-311.

A. Ortega, et al., "Rate-Distortion Methods for Image and Video Compression", IEEE Signal Processing Magazine, 15(6):23-50, Nov. 1998.

Wiegand, "Study of Final Committee Draft of Joint Video Specification ITU-T Rec. H.264, ISO/IEC 14496-10 AVC", Awaji MPEG Meeting, Dec. 2002.

M. Rabbani et al., "An Overview of the JPEG-2000 Still Image Compression Standard", Signal Processing: Image Communication 17 (2002) 3-48. Equation 16.

"Distributed Medium Access Control (MAC) for Wireless Networks", Multiband OFDM Alliance Special Interest Group, "WiMedia MAC 0.99 RC1", 2005.

JPEG2000 Final Committee Draft Version 1.0, "JPEG 2000 Image Coding System," Mar. 2000.

T. Cover et al. , "Elements of Information Theory", Wiley 1991, p. 104.

M. Ghanbari, "Video Coding—An Introduction to Standard Codecs", IEE 1999, p. 26.

G. Strang et al., "Wavelets and Filter Banks", Wellseley Cambridge Press, 1996.

R. Gonzalez et al., "Digital Image Processing Using Matlab", Prentice Hall 2004.

Chrysafis C et al: "Line based reduced memory, wavelet image compression", Data Compression Conference, 1998. DCC '98. Proceedings Snowbird, UT, USA Mar. 30-Apr. 1, 1998, Los Alamitos, CA, USA,IEEE Comput. Soc, US, Mar. 30, 1998, pp. 398-407, XP010276575, DOI: DOI:10.1109/DCC.1998.672177 ISBN : 978-0-81 86-8406-7.

Houng-Jyh Wang et al: "A multi-threshold wavelet coder (MTWC) for high fidelity image compression", Image,Processing, 1997. Proceedings., International Conference on Santa Barbara, CA, USA Oct. 26-29, 1997, Los Alamitos, CA, USA,IEEE Comput. Soc, US, vol . 1, Oct. 26, 1997, pp. 652-655, XP010254255, DO1 : DO1 : 10.1109/ICIP. 1997.647997 ISBN: 978-0-8186-8183-7.

Supplementary European Search Report—EP07869042, Search Authority—Munich Patent Office, Dec. 3, 2010.

Westerink P H et al: "An optimal bit allocation algorithm for subband coding", 19880411; 19880411—19880414, Apr. 11, 1988, pp. 757-760, XP010072543.

* cited by examiner $$clip(x,B) = \begin{cases} x, \text{ if } x \leq B, \\ B, \text{ otherwise.} \end{cases}$$

LINE-BASED VIDEO COMPRESSION

PRIORITY DATA

This application claims priority to U.S. provisional patent application Ser. No. 60/869,071, titled, "LINE-BASED VIDEO RATE CONTROL", filed Dec. 7, 2006, the disclosure of which is incorporated herein by reference.

RELATED PATENT APPLICATION

This application is related to the following: U.S. patent application Ser. No. 11/952,788, titled "LINE-BASED VIDEO RATE CONTROL" filed Dec. 7, 2007; assigned to a common assignee.

TECHNICAL FIELD

The present invention relates generally to wireless communications and more specifically to line-based rate control for wireless video data transmission.

BACKGROUND

Ultra-Wideband (UWB) wireless communication enables data transmission at unprecedented high rates. Video transmission benefits from these high rates because high-definition video formats can now be transmitted at lower compression ratios than previously possible. Prior art systems rely on frame-based or block-based compression schemes, which fall into two broad categories.

To transmit video over a channel with specified capacity, non-scalable rate-control methods employ complicated heuristics to select quantization parameters that compress blocks of video frames so that the average bit rate is close to the channel capacity. However, because instantaneous bit rates may greatly exceed the channel capacity, these methods use large buffers to prevent data loss.

When video is transmitted with scalable rate control, each video frame or block is coded into a scalable (or embedded) bit stream which may be truncated at any point to guarantee that the instantaneous bit rate never exceeds the channel capacity. However, these methods use enough memory to buffer an entire frame or block so that complex, multipass, bit plane-oriented processing can generate a scalable bit stream.

Typically, video rate-control methods apply rate-distortion theory to optimize quality by minimizing distortion for a given rate. In practice, frame-based and block-based video coders use multipass methods or expensive searches, for rate-constrained distortion minimization.

In contrast to frame-based and block-based systems, the proposed line-based rate control adapts video compression on a line-by-line basis to varying system conditions such as buffer status and channel capacity. As wireless video systems move from frame- and block-based to line-based rate control, there is a need in the art for determining the minimal quantization parameters for line-based rate control such that maximal video quality is obtained without buffer overflow, under varying channel capacity.

BRIEF DESCRIPTION OF THE DRAWINGS

Aspects of the present disclosure are best understood from the following detailed description when read with the accompanying figures, in which.

DETAILED DESCRIPTION

Figure 1:
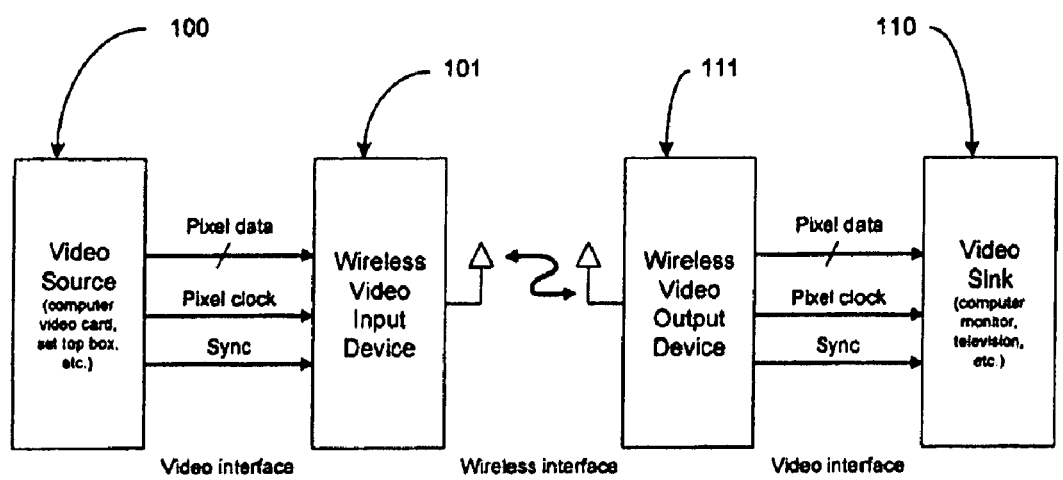
FIG. 1 is a block diagram of a typical wireless video system in which an embodiment of the present invention may be implemented.

An image/video encoder generally consists of two components, a compression engine and a rate control. The rate control receives inputs from the system in which the encoder is embedded and then generates parameters which control the operation of the compression engine so that the output bitstream can be transmitted by the system. An embodiment of the present invention provides a method for low-complexity, low-cost, line-based compression and rate control.

Consider an image/video encoder which receives the following feedback from the underlying system:
 (a) initial throughput estimate,
 (b) packet size,
 (c) packet re-transmission feedback,
 (d) notification of upcoming video-disabled time slots, and
 (e) transmit-buffer fullness.

Another embodiment of the present invention provides a low-cost, firmware-implementable method to improve decoded image/video quality by using the above-mentioned feedback to change the operating point adaptively, via rate control, on a packet-by-packet basis.

In another variation, the image/video encoder receives the following feedback from the underlying system:
 (a) initial throughput estimate,
 (b) compressed line size,
 (c) packet re-transmission feedback,
 (d) notification of upcoming video-disabled time slots, and
 (e) transmit-buffer fullness.

This alternate embodiment provides a low-cost, hardware-implementable (as opposed to firmware) method to improve decoded image/video quality by using the above-mentioned feedback to change the operating point adaptively, via rate control, on a line-by-line basis.

As stated above, an image/video encoder generally consists of two components, a compression engine and a rate control. The rate control receives inputs from the system in which the encoder is embedded and then generates parameters which control the operation of the compression engine so that the output bitstream can be transmitted by the system. The decoder corresponding to the encoder consists of a de-compression engine which inverts the operations of the compression engine so that the raw image/video data is reconstructed from the bitstream. An embodiment the present invention provides a method for a low-complexity, low-cost, line-based compression engine. By inverting the operations in this compression engine, the corresponding decoder is obtained.

A further embodiment of the present invention includes a rounding method that results in higher lossless and lossy compression ratios. Wavelet transforms are often used to de-correlate image/video data and thus increase lossless and lossy compression ratios. To lower implementation cost, rounding operations are used to implement integer versions of the wavelet transforms.

In an image/video encoder which uses a multi-resolution transform followed by entropy coding in which longer codes are assigned to large highpass coefficients corresponding to edges in the original data. Another embodiment of the present invention provides a method to increase the compression ratio.

A further embodiment of the present invention covers a method for improved distortion-estimation accuracy. In an image/video encoder with a wavelet-transform based compression engine, the rate control estimates pixel-domain distortions from wavelet-domain distortions. Unfortunately, because of rounding noise, the accuracy of pixel-domain distortion estimates is reduced when a low-complexity, integer wavelet transform is used.

In an image/video encoder in which the compression engine encodes a quantized two-dimensional array with localized areas containing strong vertical and/or horizontal correlation, higher compression ratios can be obtained if prediction residuals are generated in the direction of maximum correlation for each array element. An embodiment of the present invention provides a heuristic-driven method for generating prediction residuals from quantized data. The heuristics drive prediction in the direction of maximum correlation so that is unnecessary to supply the decoder with additional data specifying this direction at each array element.

The rate control for this encoder predicts the bit consumption for the encoded array at all quantization levels. A further embodiment of the present invention provides a low-complexity method for predicting the exact bit consumption of entropy-coded residuals at various specified quantization levels.

In an image/video encoder, the compression engine includes an entropy encoder to create a bitstream. Golomb codes can be used to implement an efficient, low-complexity, low-cost entropy coder. An embodiment of the present invention provides a reduced-cost method for generating Golomb codes for image/video encoders. The inverse of this method specifies the entropy decoding process for the corresponding image/video decoder. Furthermore, basic elements of an arithmetic coder can be used to improve Golomb-coding performance.

FIG. 1 is a block diagram of a typical wireless video system in which an embodiment of the present invention may be implemented. A video data stream is transferred wirelessly from a video source 100 to a video sink 110 (e.g., computer monitor, television, etc.). The wireless video input device 101 and output device 111 provide the wireless connectivity.

Figure 2:
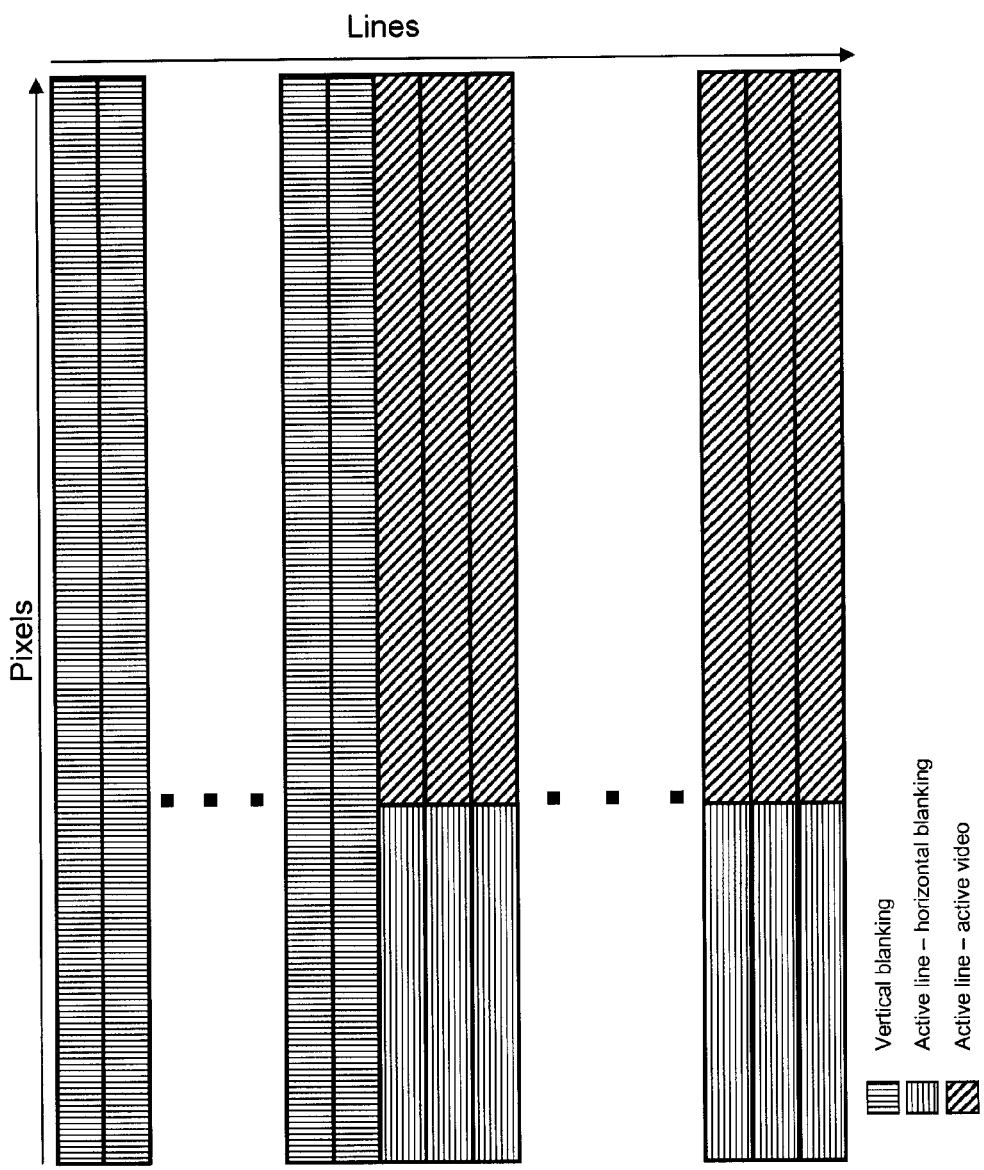
FIG. 2 shows the format of a video frame in accordance with an embodiment of the present invention.

FIG. 2 shows the format of a video frame in accordance with an embodiment of the present invention. Each video frame is composed of active and blanking lines. Each active line is composed of active and blanking pixels. Data during the active video section of the video frame is displayed and this data consists of three color components in Red, Green, and Blue (RGB) or YUV 4:2:2 format. (In the YUV color model, Y represents the luminance signal, and U and V represent the color-difference signals.)

Figure 3:
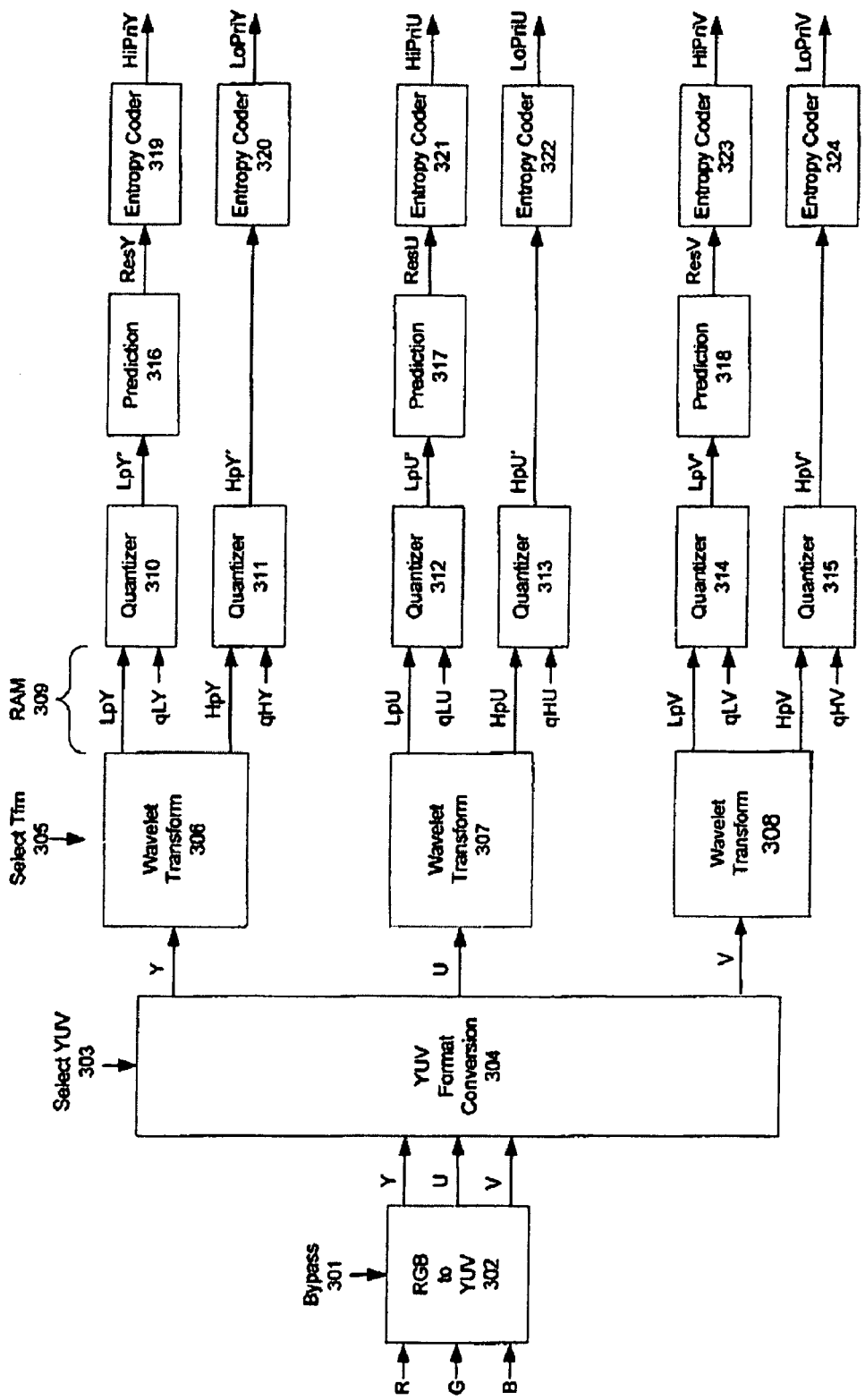
FIG. 3 shows a block diagram outlining the data flow for RGB components of each line of a video frame in accordance with an embodiment of the present invention.

FIG. 3 shows a block diagram outlining the data flow for RGB components of each line of a video frame in accordance with an embodiment of the present invention. The RGB-to-YUV block 302 uses a color-space transform to map the Red, Green, and Blue components for each pixel into corresponding YUV components in 4:4:4 format. If the Bypass control 301 is asserted, the RGB-to-YUV block 302 is bypassed.

The Select YUV control 303 determines whether the YUV Format Conversion block 304 is bypassed or whether lowpass filters and downsamplers will convert YUV 4:4:4 format to YUV 4:2:2 or YUV 4:1:1 format.

The YUV components produced by the YUV Format Conversion Block 304 are passed through separate wavelet transforms 306 (Y), 307 (U) and 308 (V). The SelectTfm control 305 determines whether two-level integer versions of the Daubechies (7,9) or the LeGall (5,3) wavelet transforms are used to generate lowpass and highpass subbands for each color-component. Because two-level wavelet transforms are used, for a given line, the number of lowpass (high priority) wavelet coefficients constitutes 25% of the pixels in the line, and highpass (low priority) wavelet coefficients constitute 75% of the pixels in the line.

For the Y-component, the lowpass subband is labeled LpY, and the highpass subband is labeled HpY. Similarly, the corresponding subbands for the U and V components are labeled LpU, HpU, LpV, HpV respectively. The LpY, HpY, LpU, HpU, LpV, HpV subbands for a given line are stored in a RAM 309, providing video rate control access to all subbands for a given line to determine optimal quantization settings for those subbands.

Once the wavelet transforms are completed, video rate control determines the optimal quantization levels qLY, qHY, qLU, qHU, qLV, qHV for the respective subbands LpY, HpY, LpU, HpU, LpV, HpV (explained in more detail below). The respective pairs of subband coefficients and quantization levels (e.g., LpY/qLY, HpY/qHY, etc.) are fed into quantizers 310-315, which calculate the quantized coefficient $x_q$ by the following process:

$x_q = x >> q$,

If (x<0) AND (q LSBs of x are NOT all 0s) AND (q<>0)

$x_q = x_q + 1$

The above pseudocode shows that the quantizer eliminates the q least significant bits of x by rightshifting, to get $x_q$. To obtain shorter entropy codes, minus values of $x_q$ are incremented so that minus numbers are rounded towards zero.

After quantization, the data is conditioned to fit an exponential distribution because entropy coders output optimally short codes for exponentially distributed data in which most samples are clustered around zero.

The quantized highpass subbands HpY', HpU', HpV' are already exponentially distributed and do not need conditioning. (See "Noise Removal via Bayesian Wavelet Coring", E. P. Simoncelli, E. H. Adelson, *Proceedings of 3rd IEEE International Conference on Image Processing*", Vol. 1, pp. 379-382, September 1996, the contents of which are hereby incorporated by reference.)

For the quantized lowpass subbands LpY', LpU', and LpV', an embodiment of the present invention applies a prediction process 316, 317, 318 to create exponentially distributed prediction residuals ResY, ResU, ResV, respectively. This prediction process utilizes the low pass section of the previous pixel line. Table 1 below shows Row n and Row n-1 of the quantized LP subband.

TABLE 1

| | Col 1 | Col 2 | ... | Col m − 1 | Col m | ... |
|---|---|---|---|---|---|---|
| Row 1 | | | | | | |
| Row 2 | | | | | | |
| ... | | | | | | |
| Row n − 1 | | | | $a_q$ | $b_q$ | $Q_{n-1}$ |
| Row n | | | | $c_q$ | $x_q$ | $Q_n$ |
| ... | | | | | | |

For the following inputs, output consists of an LP residual, dx, for each quantized entry, $x_q$, of Row n:
1) Row n and Row n−1 of the quantized LP subband,
2) Qn, Qn−1: quantization levels for Row n, Row n−1 respectively. Note: Because Row 1 is the first row of the quantized LP subband, Row 0 and $Q_0$ are undefined and therefore not used below.

3) Prediction mode: inter-line prediction or intra-line prediction. Note: The same prediction mode applies to all entries in Row n.

Inter-line prediction comprises using Row n−1 to predict Row n. (Obviously, this prediction mode is invalid for n=1.) In this prediction process, the Row n−1 entries are scaled so that they have the same quantization level as Row n entries. Consider the following four cases:

Case 1: $n>1, m>1, Q_{n-1}>=Q_n$ $a_q = a_q << (Q_{n-1} - Q_n)$, $b_q = b_q << (Q_{n-1} - Q_n)$, Case 2: $n>1, m>1, Q_{n-1}<Q_n$ $a_q = a_q >> (Q_n - Q_{n-1})$, $b_q = b_q >> (Q_n - Q_{n-1})$, Case 3: $n>1, m=1, Q_{n-1}>=Q_n$ $b_q = b_q << (Q_{n-1} - Q_n)$, Case 4: $n>1, m=1, Q_{n-1}<Q_n$ $b_q = b_q >> (Q_n - Q_{n-1})$.

After scaling Row n−1 entries appropriately, the following prediction process is used to generate the residual dx corresponding to $x_q$:

For Cases 1 and 2:

If $|a_q - c_q| <= |a_q - b_q|$ $dx = x_q - b_q$

Else $dx = x_q - c_q$

For Cases 3 and 4, $dx = x_q - b_q$.

For intra-line prediction, Row n−1 is not used to predict Row n. This prediction mode is mandatory for n=1 and may also be selected for n>1 when one wishes to code Row n independently of Row n−1. Unlike inter-line prediction, intra-line prediction does not require scaling. The residual dx corresponding to xq is derived according to the following two cases:

Case 5: $m>1: dx = x_q - c_q$,

Case 6: $m=1: dx = x_q$.

Following the prediction process, the residuals ResY, ResU, ResV and the highpass subbands HpY', HpU', HpV' are now exponentially distributed. This allows an embodiment of the present invention to use the extremely simple, yet effective, exponential-Golomb codes in the entropy coders 319-324. (For a description of exponential-Golomb codes see "A Compression Method for Clustered Bit-Vectors", J. Teuhola, *Information Processing Letters*, Vol. 7, pp. 308-311, October 1978, the contents of which are hereby incorporated by reference.)

Prior art systems use the exponential-Golomb codes to encode wavelet-coefficient runlengths. (See "Generalized Golomb Codes and Adaptive Coding of Wavelet-Transformed Image Subbands", A. Kiely, and M. Klimesh, *IPN PR 42-154, Jet-Propulsion Laboratory, California Institute of Technology*, April-June 2003, pp. 1-14, Aug. 15, 2003.) In contrast, an embodiment of the present invention uses these codes to encode highpass subbands and lowpass subband prediction residuals. Conditioning the data for exponential- Golomb coding with simple prediction residuals obtains an efficient, yet exact, rate-estimation technique for video rate-control (explained below).

Figure 4:
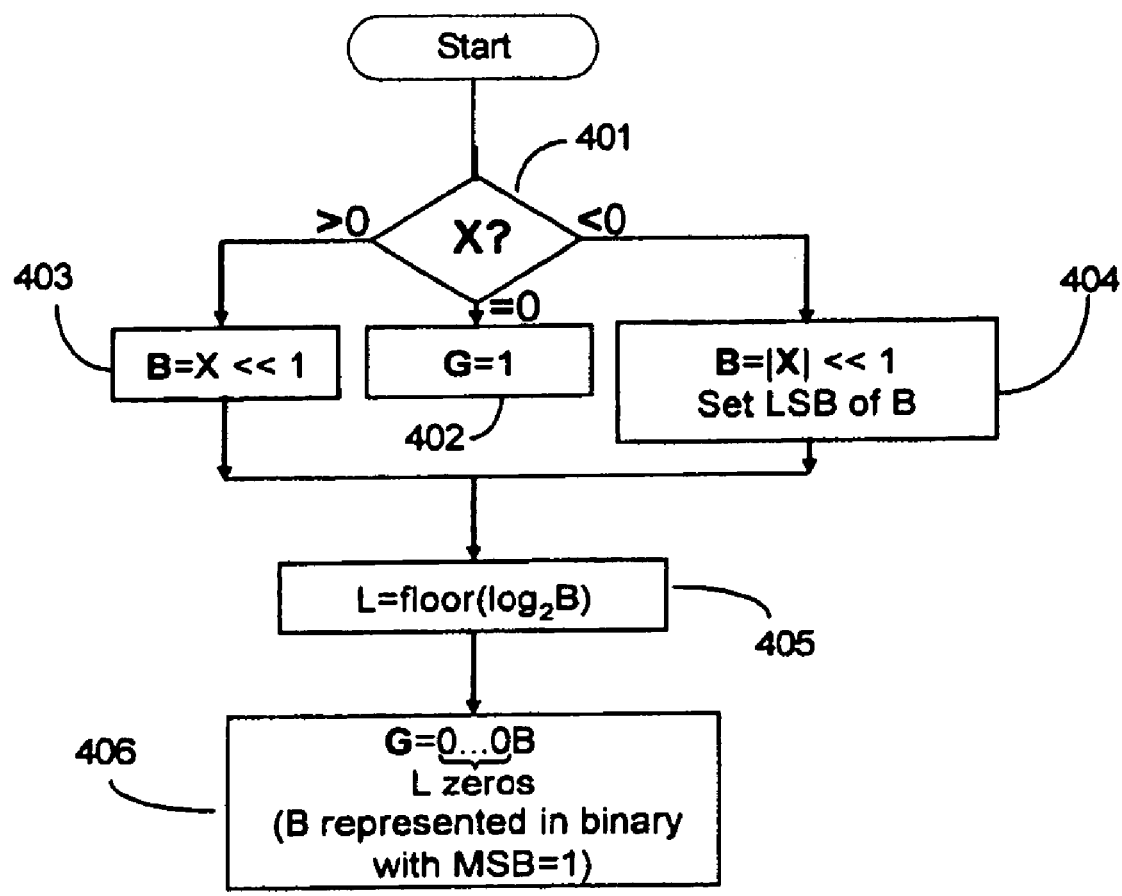
FIG. 4 is a flowchart illustrating the process of defining the exponential-Golomb code associated with an integer drawn from a highpass subband or lowpass subband prediction residual.

FIG. 4 is a flowchart illustrating the process of defining the exponential-Golomb code G associated with an integer X drawn from a highpass subband or lowpass subband prediction residual. The first step is to determine the sign of the integer X (step 401).

If X=0, the Golomb code is set equal to 1 (G=1) (step 402). For a plus X (>0), B is the binary representation of X, left shifted by 1 bit (step 403). For a minus X (<0), the procedure is similar except that the absolute value of X generates B, and the least significant bit of B is set (step 404).

L is the number of leading zeros proceeding B and is defined by floor($\log_2 B$) (step 405). L is one less than the bit length of B.

Therefore, for a plus or minus integer X, the Golomb code, G, consists of L leading zeros followed by B, with B represented in binary with the most significant bit set at 1 (step 406).

To illustrate the exponential-Golomb coding process, the following list shows the Golomb codes, G, for X ∈ [−10, 10], along with the code lengths:
X=−10, G=000010101, length=9
X=−9, G=000010011, length=9
X=−8, G=000010001, length=9
X=−7, G=0001111, length=7
X=−6, G=0001101, length=7
X=−5, G=0001011, length=7
X=−4, G=0001001, length=7
X=−3, G=00111, length=5
X=−2, G=00101, length=5
X=−1, G=011, length=3
X=0, G=1, length=1
X=1, G=010, length=3
X=2, G=00100, length=5
X=3, G=00110, length=5
X=4, G=0001000, length=7
X=5, G=0001010, length=7
X=6, G=0001100, length=7
X=7, G=0001110, length=7
X=8, G=000010000, length=9
X=9, G=000010010, length=9
X=10, G=000010100, length=9

The Golomb code implementation in an embodiment of the present invention is extremely efficient because it does not require any arithmetic. In particular, although floor($\log_2 B$) is used to succinctly define L in the embodiment described above, another embodiment uses simple logic to find the most-significant bit, and hence the bit length of B.

Finally, returning to FIG. 3, an embodiment of the present invention labels the entropy-coded ResY, ResU, ResV, HpY', HpU', and HpV' data as HiPriY, HiPriU, HiPriV, LoPriY, LoPriU, LoPriV.

Figure 5:
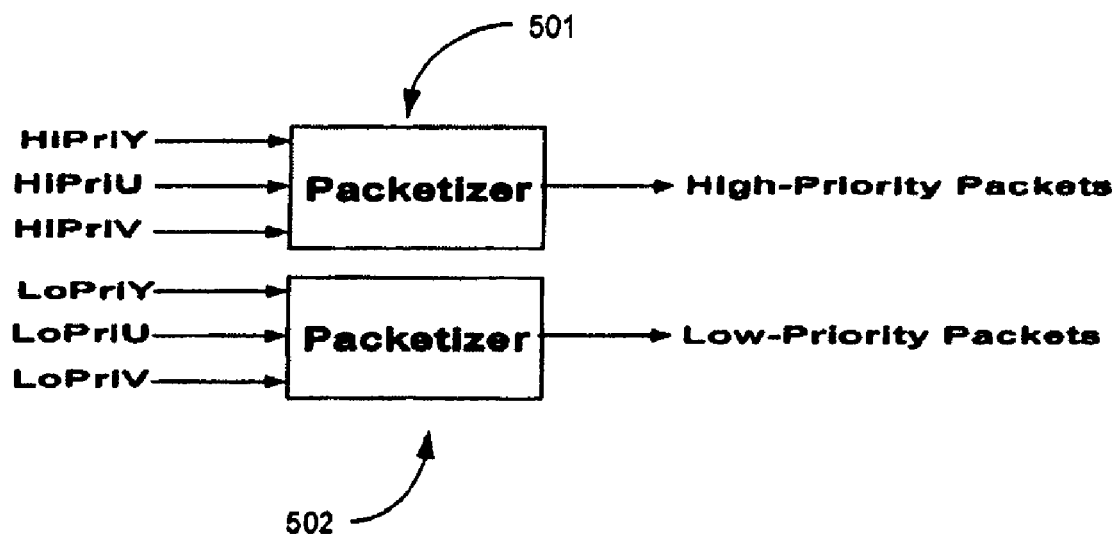
FIG. 5 show a pair of packetizers in accordance with an embodiment of the present invention.

FIG. 5 show a pair of packetizers in accordance with an embodiment of the present invention. Separate packetizers 501, 502 accumulate HiPriY, HiPriU, HiPriV into a high-priority packet and LoPriY, LoPriU, LoPriV into a low-priority packet, respectively. The prioritization is done so that packets containing residual data will be offered greater protection than packets containing highpass subbands. Because residual data from one line is used in inter-line prediction of the next line, residual data loss may cause errors to propagate onto a subsequent line. In contrast, since highpass data for a given line is independent of other lines, highpass data loss does not affect subsequent lines. It should be noted that the packetizers typically pack data from more than one line into a single packet.

A key component of the operation of the line-based encoder depicted in FIG. 3 is the Video Rate-Control (VRC) method that determines the minimal quantization parameters for each line (qLY, qHY, qLU, qHU, qLV, qHV) necessary to obtain maximal video quality without buffer overflow, under varying channel capacity. An embodiment of the present invention uses small buffers and a singlepass scan, providing significantly lower complexity than prior art frame- or block-based techniques, which use large buffers and multipass, bitplane-oriented approaches involving complicated searches.

Figure 6:
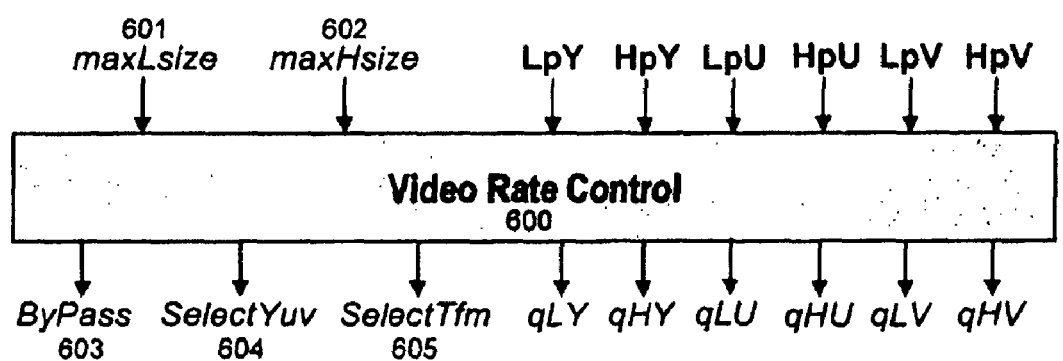
FIG. 6 shows the inputs that the Video Rate Control uses to generate the control outputs to optimize video encoding for minimum distortion without buffer overflow in accordance with an embodiment of the present invention.

FIG. 6 shows the inputs that the VRC uses to generate the control outputs to optimize video encoding for minimum distortion without buffer overflow in accordance with an embodiment of the present invention. In the preferred embodiment of the present invention, the VRC is implemented in hardware. From a timing perspective, shortly before the active pixels for a given line are available, the Medium Access Controller (MAC) specifies maxLsize 601 and maxHsize 602, which respectively indicate the maximum encoded line sizes for lowpass and highpass portions of the current line.

These maximum line sizes are easily calculated from a channel capacity estimate provided by the Physical Layer (PHY). maxLsize and maxHsize index into a table specifying Bypass 603, SelectYUV 604, and SelectTfm 605 values that provide good compression results for the specified maximum line sizes.

Once the active pixels for a given line become available, they are clocked through the encoder with the selected Bypass 603, SelectYUV 604, and SelectTfm 605 values. The VRC 600 samples the LpY, HpY, LpU, HpU, LpV, and HpV subbands as they are stored in the RAM (shown in FIG. 3). Simultaneously, the VRC 600 uses the subband samples to compile rate and distortion information for all allowable combinations of quantization values. Shortly after the horizontal blanking period begins following the last active pixel for the line (see FIG. 2), the rate and distortion information is available respectively as high- and low-priority encoded line sizes and squared errors for all allowable combinations of quantization values.

Within a few clock cycles, the VRC 600 performs a single-pass scan of the high-priority encoded line sizes corresponding to all qHY, qHU, qHV combinations. During this scan, it considers the qHY, qHU, qHV combinations associated with encoded line sizes which are smaller than maxHsize. After the scan is completed, qHY, qHU, qHV are set to the considered combination with the minimal squared error. The control values qLY, qLU, qLV are determined similarly before the end of the horizontal blanking period.

The quantizers can now use the optimal quantization settings qHY, qHU, qHV, qLY, qLU, and qLV to begin quantizing the complete LpY, HpY, LpU, HpU, LpV, and HpV subbands in RAM. This timing schedule ensures that adequate RAM space is freed before subband samples for the next line need to be stored.

To simplify the following explanation of the VRC, qHY, qHU, qHV will be restricted to the set {0,2,4,6} and qLY, qLU, qLV to the set {0,1,2,3}. Empirical evidence also reveals that qHU is usually equal to qHV and qLU is usually equal to qLV. Therefore, for purposes of the present discussion, the VRC method can be simplified by determining qHUV from HpU, HpV and then setting qHU=qHV=qHUV. Similarly, qLUV is obtained from LpU, LpV. The last step is to set qLU=qLV=qLUV.

These restrictions yield excellent results and may be implemented in the preferred embodiment. However, the above requirements are not required of alternative embodiments in accordance with the present invention.

Figure 7:
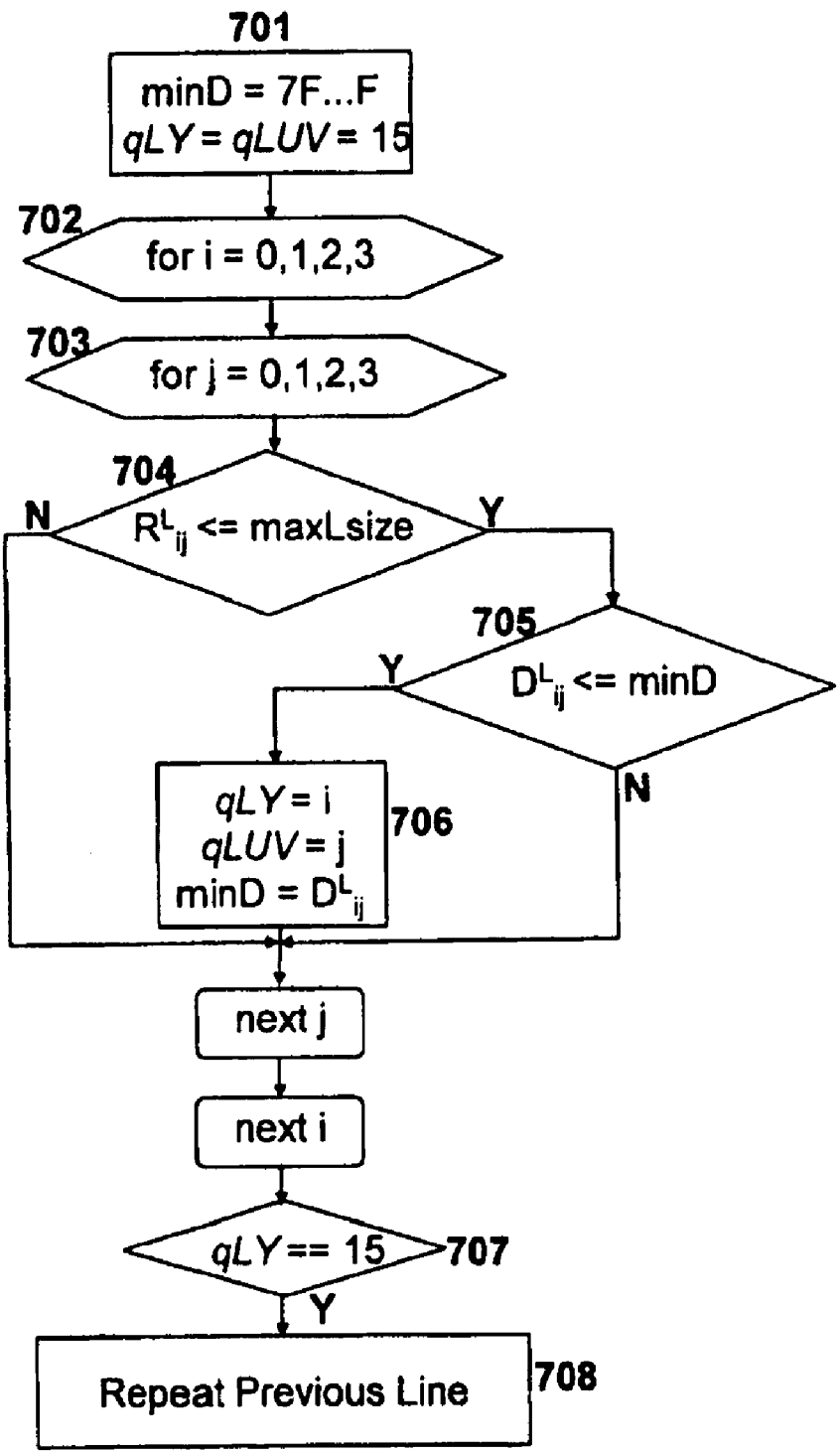
FIG. 7 shows a flowchart that illustrates the process executed during the horizontal blanking period to determine optimal lowpass quantization settings.

FIG. 7 shows a flowchart that illustrates the process executed during the horizontal blanking period to determine optimal lowpass quantization settings. These quantization setting (qLY, qLUV) are derived from the inputs maxLsize, $R^L_{ij}$, and $D^L_{ij}$, for i,j={0,1,2,3}. Subscript i denotes the quantization levels for Y, and j denotes the quantization levels for UV. $R^L$ represents rates, and $D^L$ represents distortions. Therefore, $R^L_{ij}$ denotes the coded length of the lowpass portion of a line when the LpY subband is quantized by i bits and the LpU, LpV subbands are quantized by j bits, respectively. Similarly, $D^L_{ij}$ denotes the squared error from the lowpass portion of a line when the LpY subband is quantized by i bits and the LpU, LpV subbands are quantized by j bits, respectively.

Step 701 initializes minimum distortion to a large value. In the present example, the quantization levels qLY and qLUV are set to 15. Steps 702, 703 begin a nested loop that cycles through the four qLY quantization levels and the four qLUV quantization levels. Therefore, all sixteen combinations of qLY and qLUV are examined in the nested loop.

For each of the sixteen combinations, Step 704 determines whether the coded length of the lowpass portion of the current line is lower than maxLsize for a particular combination of quantization levels. If not, then the next combination is examined.

If the lowpass portion is not lower than maxLsize, Step 705 determines whether the distortion associated with the combination is the smallest distortion yet encountered. If not, then the next combination is examined.

If the distortion associated with the combination is the smallest distortion yet encountered, Step 706 stores the quantization combination in qLY and qLUV. The variable minD is updated to hold $D^L_{ij}$ associated with the current quantization combination because this is the smallest distortion encountered so far. After the nested loop is complete, qLY and qLUV hold the quantization combination that encodes the lowpass subband below maxLsize with minimum distortion.

However, if Step 707 determines that qLY still holds 15, then Step 706 never executed, implying that for all quantization combinations, Step 704 decided that the coded lowpass subband length is greater than the allowable maximum, maxLsize. In this case, the sixteen quantization combinations are insufficient to encode the line below the allowable maximum.

It should be noted that the combination qLY=qLUV=15 cannot be guaranteed to encode the lowpass subband within maxLsize, when accounting for the prediction process. Therefore, the current line is not transmitted. Instead, Step 708 sets a control bit to force the decoder to replace the current line with the previous line.

Figure 25:
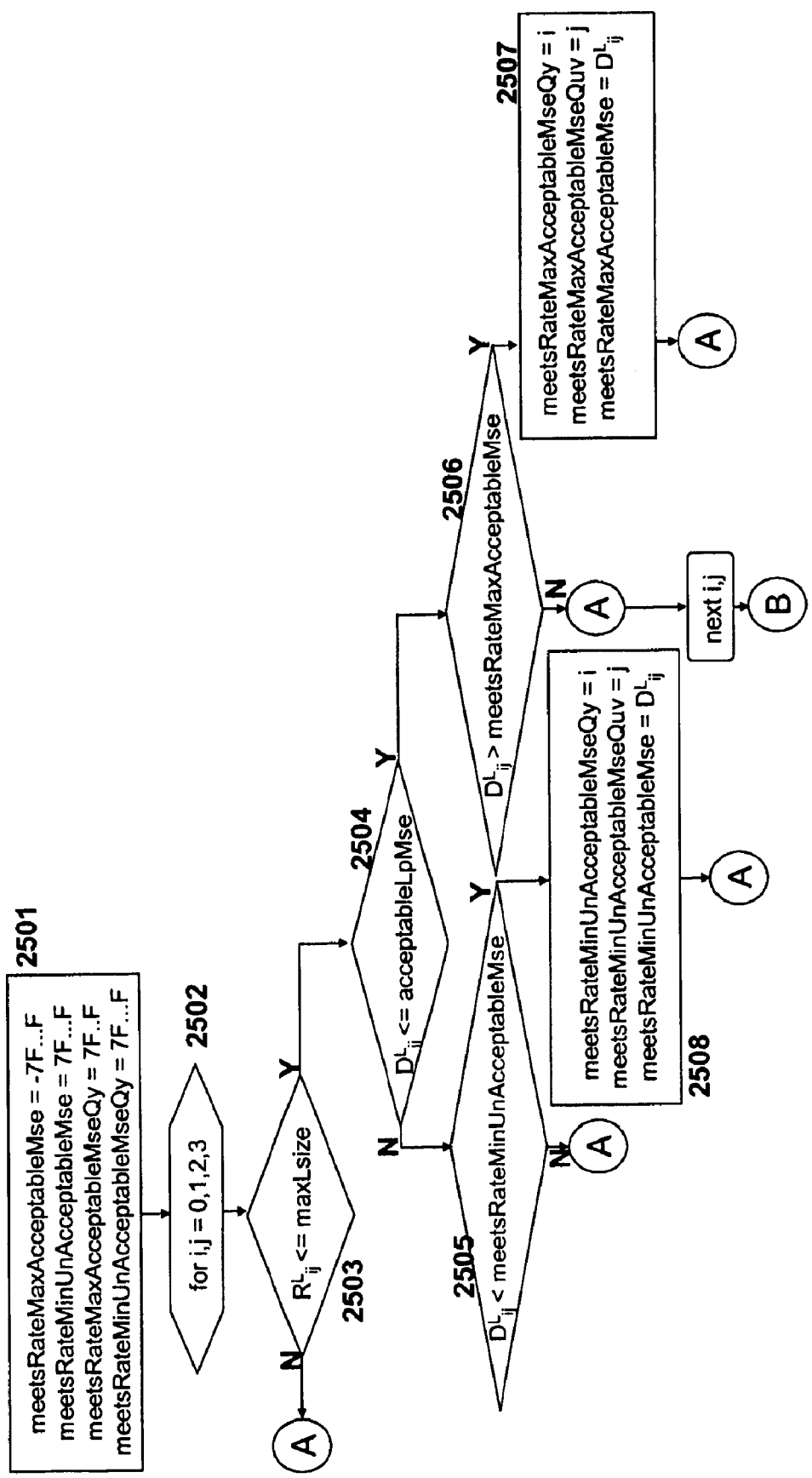
FIGS. 25 and 26 show a flowchart that illustrates a process executed during the horizontal blanking period to determine optimal lowpass quantization settings, as an alternative to the process illustrated in FIG. 7.
Figure 26:
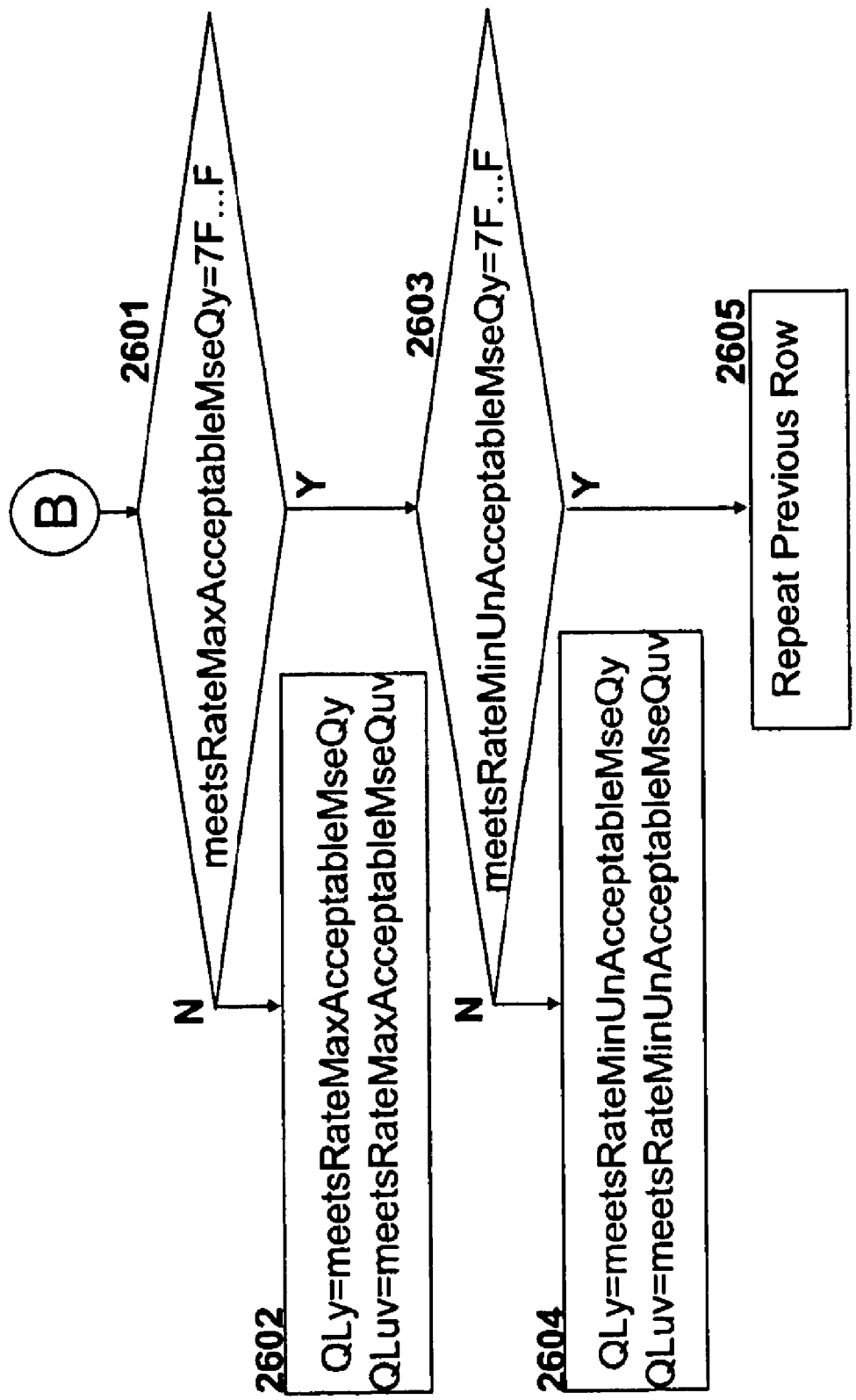

FIGS. 25 and 26 show an alternate flowchart which may be used instead of the flowchart in FIG. 7 to determine optimal lowpass quantization settings during the horizontal blanking period. The alternate flowchart improves over the process of FIG. 7 because it allows the visual quality of the compressed line to be controlled directly, as explained below.

Step 2501 initializes meetsRateMaxAcceptableMse to a large negative value while meetsRateMinUnAcceptableMse, meetsRateMaxAcceptableMseQy, meetsRateMinAcceptableMseQy are each initialized to a large positive value. Step 2502 begins a nested loop that cycles through the four qLY quantization levels and the four qLUV quantization levels. Therefore all sixteen combinations of qLY and qLUV are examined in the nested loop.

For each of the sixteen combinations, Step 2503 determines whether the coded length of the lowpass portion of the current line is greater than maxLsize for a particular Quantization-Level Combination (QLC) of qLY and qLUV. If so, then the next QLC is examined because the current QLC exceeds the maximum allowable, or in other words the desired bitrate requirement will not be met by the current QLC.

If the lowpass portion is not greater than maxLsize, Step 2504 determines whether the distortion associated with the QLC is greater than acceptableLpMse. If so, then we know that the current QLC meets the desired bitrate requirement but that the associated distortion is unacceptably large. In this case, Step 2505 tests whether the current QLC has the smallest distortion of all QLCs already encountered, which meet the bitrate requirement but result in unacceptably large distortions. If so, then Step 2508 stores the current QLC and its associated distortion in meetsRateMinUnAcceptableMseQuv, meetsRateMinUnAcceptableMseQuv and meetsRateMinUnAcceptableMse.

If Step 2504 decides that the distortion associated with the QLC is acceptably small then Step 2506 tests whether the current QLC has the largest distortion of all QLCs which meet the bitrate requirement and have acceptably small distortions. If so, then Step 2507 stores the current QLC and its associated distortion in meetsRateMaxAcceptableMseQy, meetsRateMaxAcceptableMseQuv and meetsRateMaxAcceptableMse. Observe that Steps 2504, 2505, 2506, 2507, 2508 ensure that of all QLCs which meet the desired bitrate, the QLC whose associated distortion is closest to acceptableLpMse will be stored in meetsRateMinUnAcceptableMseQy, meetsRateMinUnAcceptableMseQuv or in meetsRateMaxAcceptableMseQy, meetsRateMaxAcceptableMseQuv.

After the nested loops initiated by Step 2502 have completed, all QLCs have been examined and control passes to Step 2601 in FIG. 26. This step determines whether any QLC meets the bitrate with acceptable distortion. If so (meetsRateMaxAcceptableMseQy is not equal to 7F . . . F), then, in QLy and QLuv, Step 2602 returns the QLC which meets the bitrate with distortion closest to acceptableLpMse. However, if Step 2601 decides that no QLC meets the bitrate with acceptable distortion (meetsRateMaxAcceptableMseQy is equal to 7F . . . F), then Step 2603 checks whether any QLC meets the bitrate with an unacceptably large distortion. If so (meetsRateMinUnAcceptableMseQy is not equal to 7F . . . F), then, in QLy and QLuv, Step 2604 returns the QLC which meets the bitrate with distortion closest to acceptableLpMse. Finally, if Step 2603 determined that no QLC met the bitrate with unacceptably large MSE (meetsRateMinUnAcceptableMseQy is equal to 7F . . . F), then we know that all QLCs exceed the bitrate requirement. In this case, Step 2605 sets a control bit to force the decoder to replace the current line with the previous line, as was done in Step 708.

Figure 8:
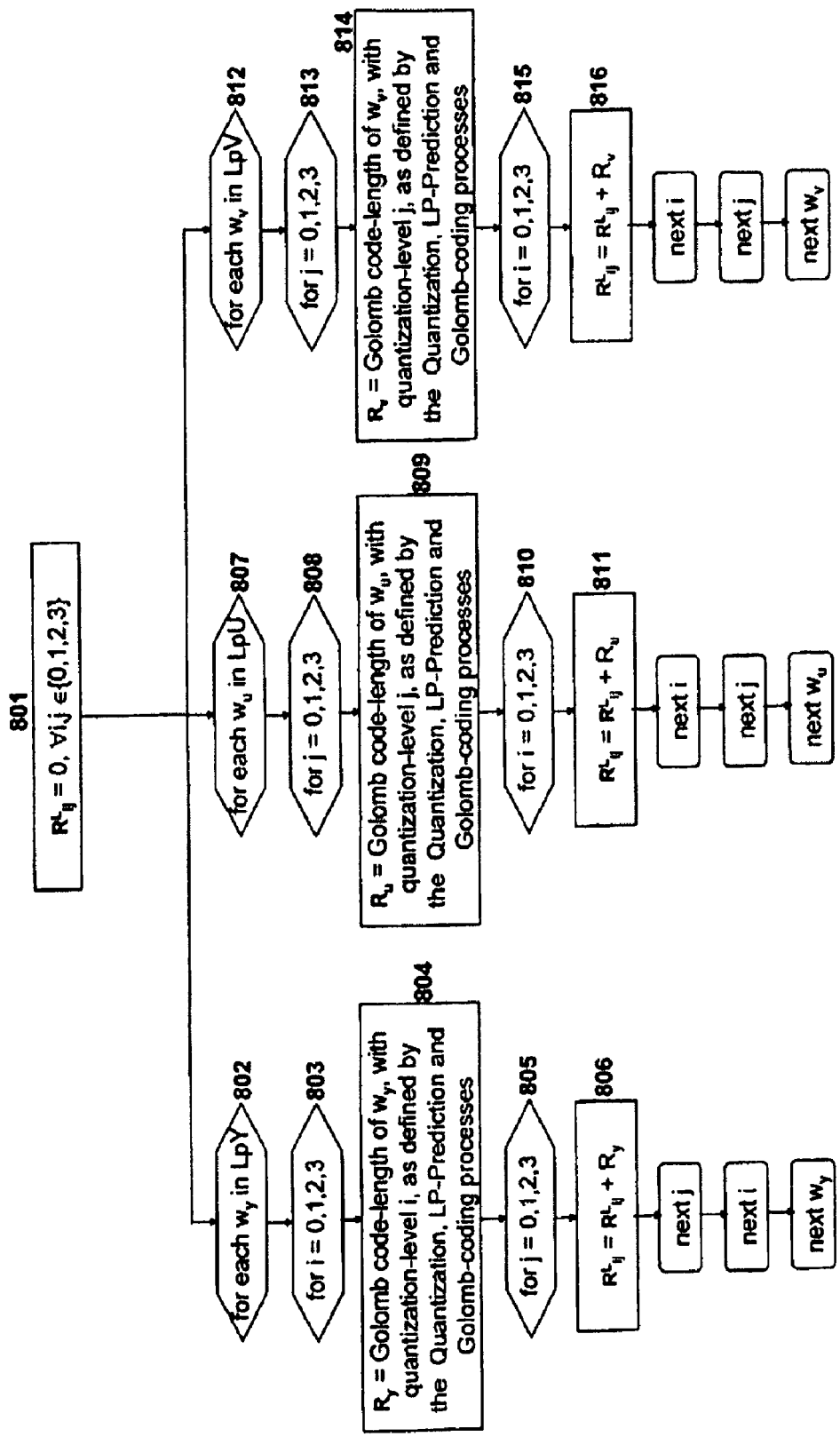
FIG. 8 shows a flowchart illustrating the computation of the coded length of the lowpass portion of a line.

FIG. 8 shows a flowchart illustrating the computation of the coded length of the lowpass portion of a line ($R^L_{ij}$). In the present example, the Y-quantization level is i={0,1,2,3}, and the UV-quantization level is j={0,1,2,3}. As active pixels are clocked through the wavelet transform, and written to RAM, the 16 values of $R^L_{ij}$ are accumulated in parallel from the wavelet coefficients $w_y$, $w_u$, $w_v$ as they become available in the LpY, LpU, and LpV subbands, respectively.

In Step 801, all 16 $R^L_{ij}$ registers are initialized to zero. Step 802 implies that rate computation considers each wavelet coefficient wy in lowpass subband LpY as the coefficient is being written to the RAM 309 in FIG. 3.

Step 803 states that all four Y-quantization levels are considered and Step 804 explains that for each Y-quantization level, the Golomb code-length, $R_y$, is computed as defined by the quantization, LP-prediction and Golomb-coding processes applied to $w_y$.

Steps 805 and 806 dictate that the four rate registers associated with different UV-quantization levels, but the same Y-quantization level, are all updated by $R_y$.

In a hardware implementation, all four instances of Step 804 are executed in parallel, as are all sixteen instances of Step 806.

Steps 807 through 811 execute analogously on the LpU subband in parallel with their counterparts in Steps 802 through 806. Similarly, Steps 812 through 816 apply to the LpV subband.

Figure 9:
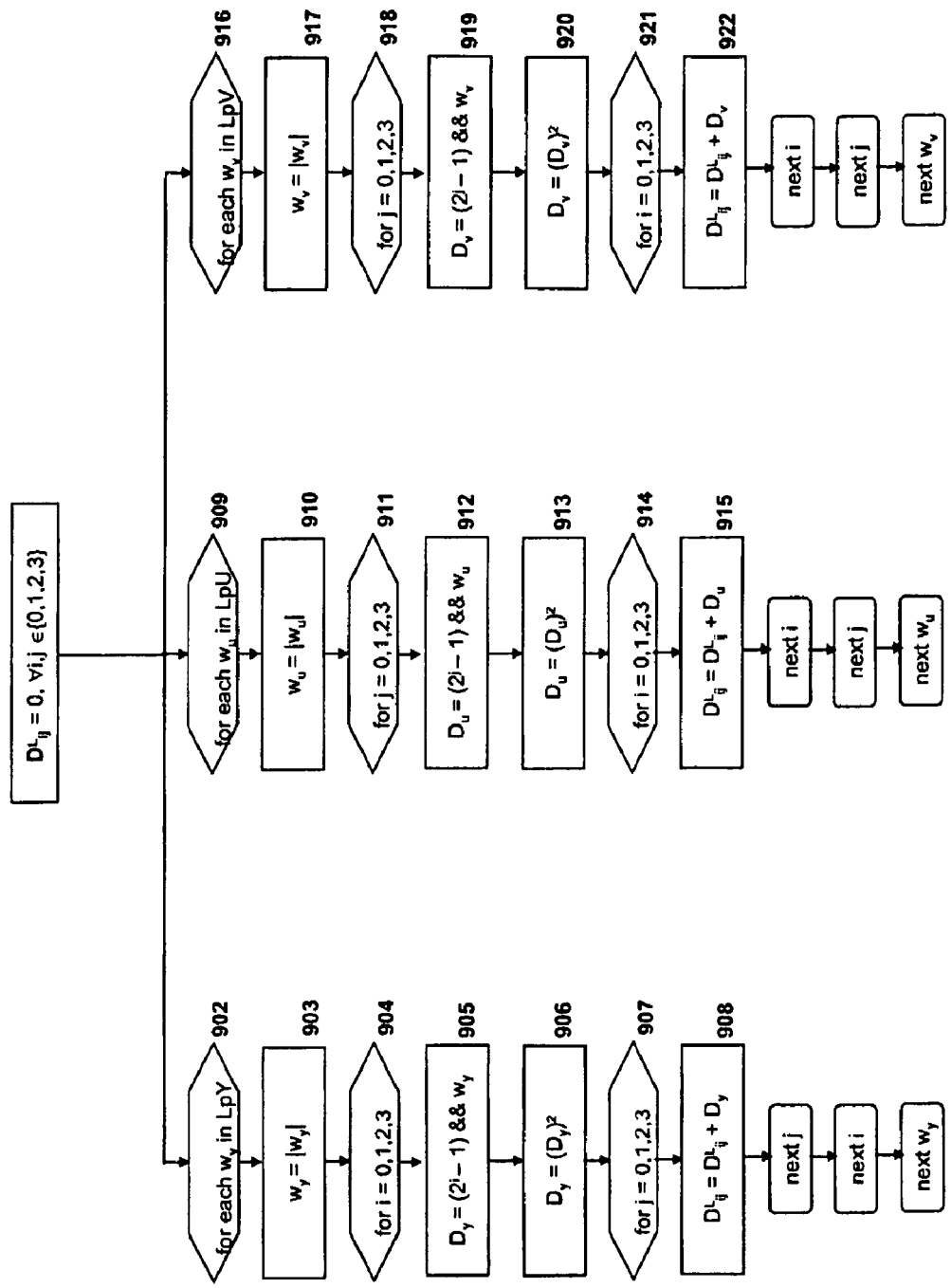
FIG. 9 shows a flowchart illustrating the computation of the squared error from the lowpass portion of a line.

FIG. 9 shows a flowchart illustrating the computation of the squared error from the lowpass portion of a line ($D^L_{ij}$). The Y-quantization level is i={0,1,2,3}, and the UV-quantization level is j={0,1,2,3}. The 16 values of $D^L_{ij}$ are accumulated in parallel from the wavelet coefficients $w_y$, $w_u$, $w_v$ as they become available in the LpY, LpU, and LpV subbands, respectively.

In Step 901, all 16 $D^L_{ij}$ registers are initialized to zero. Steps 902, 903 imply that distortion estimation consider the absolute value of each wavelet coefficient $w_y$ in lowpass subband LpY as the coefficient is being written to the RAM 309 in FIG. 3.

Step 904 states that all four Y-quantization levels are considered and Step 905 explains that for each Y-quantization level the associated wavelet-domain distortion is equal to the decimal value of the bits that are truncated at that Y-quantization level. However, because the goal is minimizing the pixel-domain distortion rather than the wavelet-domain distortion, Step 906 squares the distortion since squared wavelet-domain distortions approximate squared pixel-domain distortions for nearly-orthogonal wavelet transforms (See "Wavelets and Filter Banks" by G. Strang and T. Nguyen, Wellesley Cambridge Press, 1996).

Next, Steps 907 and 908 dictate that the four distortion registers associated with different UV-quantization levels, but the same Y-quantization level, are all updated by $D_y$.

In a hardware implementation, all four instances of Steps 905, 906 are executed in parallel, as are all sixteen instances of Step 908.

Steps 909 through 915 execute analogously on the LpU subband in parallel with their counterparts in Steps 902 through 908. Similarly, Steps 916 through 922 apply to the LpV subband.

Figure 10:
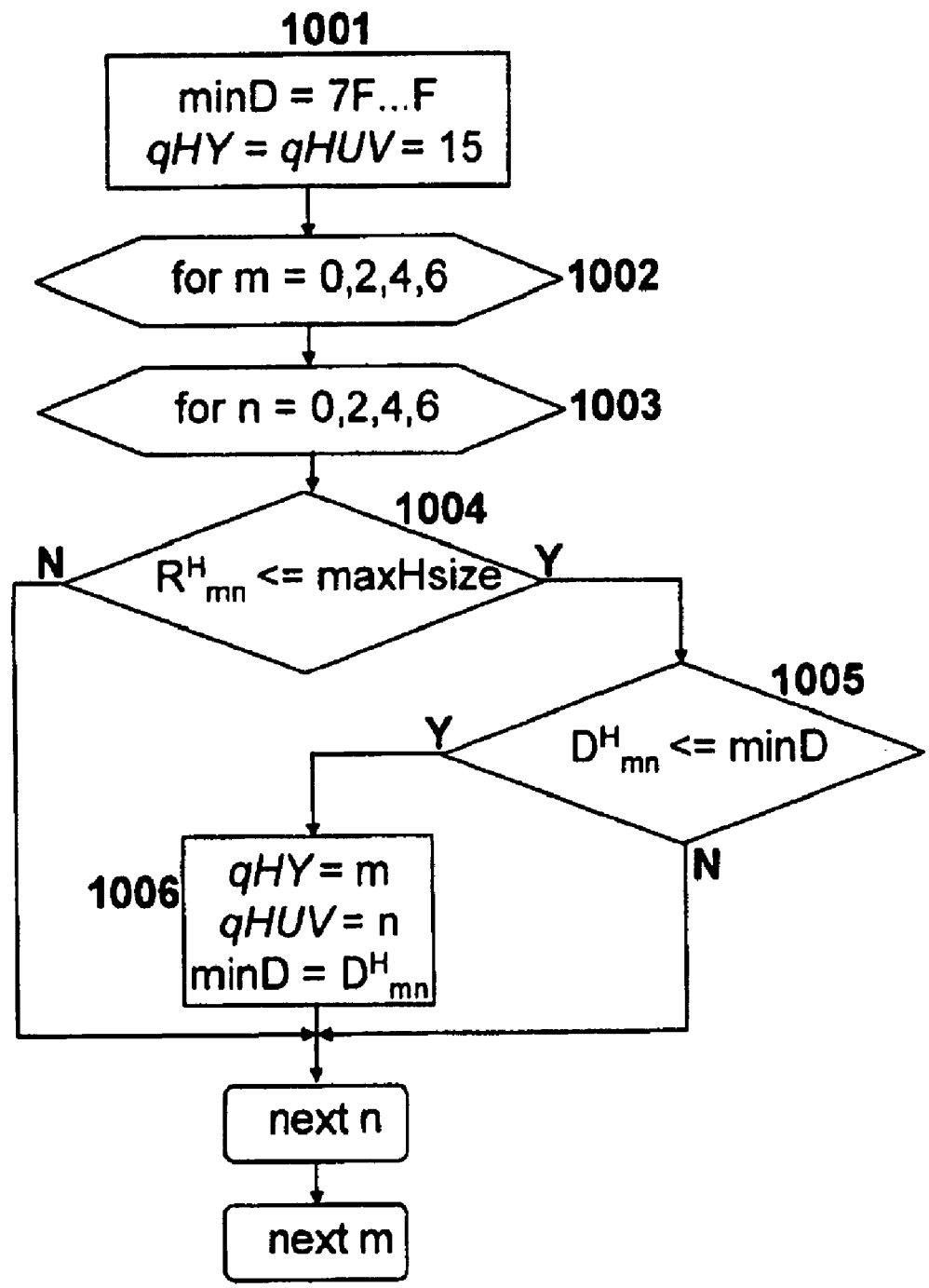
FIG. 10 shows a flowchart that illustrates the process executed during the horizontal blanking period to determine optimal highpass quantization settings.

FIG. 10 shows a flowchart that illustrates the process executed during the horizontal blanking period to determine optimal highpass quantization settings qHY, qHUV from inputs maxLsize, $R^L_{mn}$, $D^L_{mn}$, for m,n={0,2,4,6}. Subscript m denotes the Y quantization level, and n denotes the UV quantization level. $R^H$ represents rates, and $D^H$ represents distortions. Thus, $R^H_{mn}$ denotes the coded length of the highpass portion of a line when the HpY subband is quantized by m bits and the HpU, HpV subbands are quantized by n bits, respectively. Similarly, $D^H_{mn}$ denotes the squared error from the highpass portion of a line when the HpY subband is quantized by m bits and the HpU, HpV subbands are quantized by n bits, respectively.

Steps 1001 through 1006 are similar to the respective Steps 701 through 706 in FIG. 7. However, in this process there is no need for a step analogous to Step 707 because if no quantization combination meets the maxHsize target, the process can use the default qHY=qHUV=15 setting, which in this case will definitely meet the maxHsize target.

In contrast to the process in FIG. 7, highpass encoding does not involve a prediction process. Therefore the quantization combination qHY=qHUV=15 will force all highpass subband entries to zero. Hence, it is sufficient to proceed with this combination because the encoder will meet the maxHsize target by transmitting an all-zero highpass subband with a single control bit, which forces the decoder to generate the all-zero highpass subband corresponding to qHY=qHUV=15.

Figure 27:
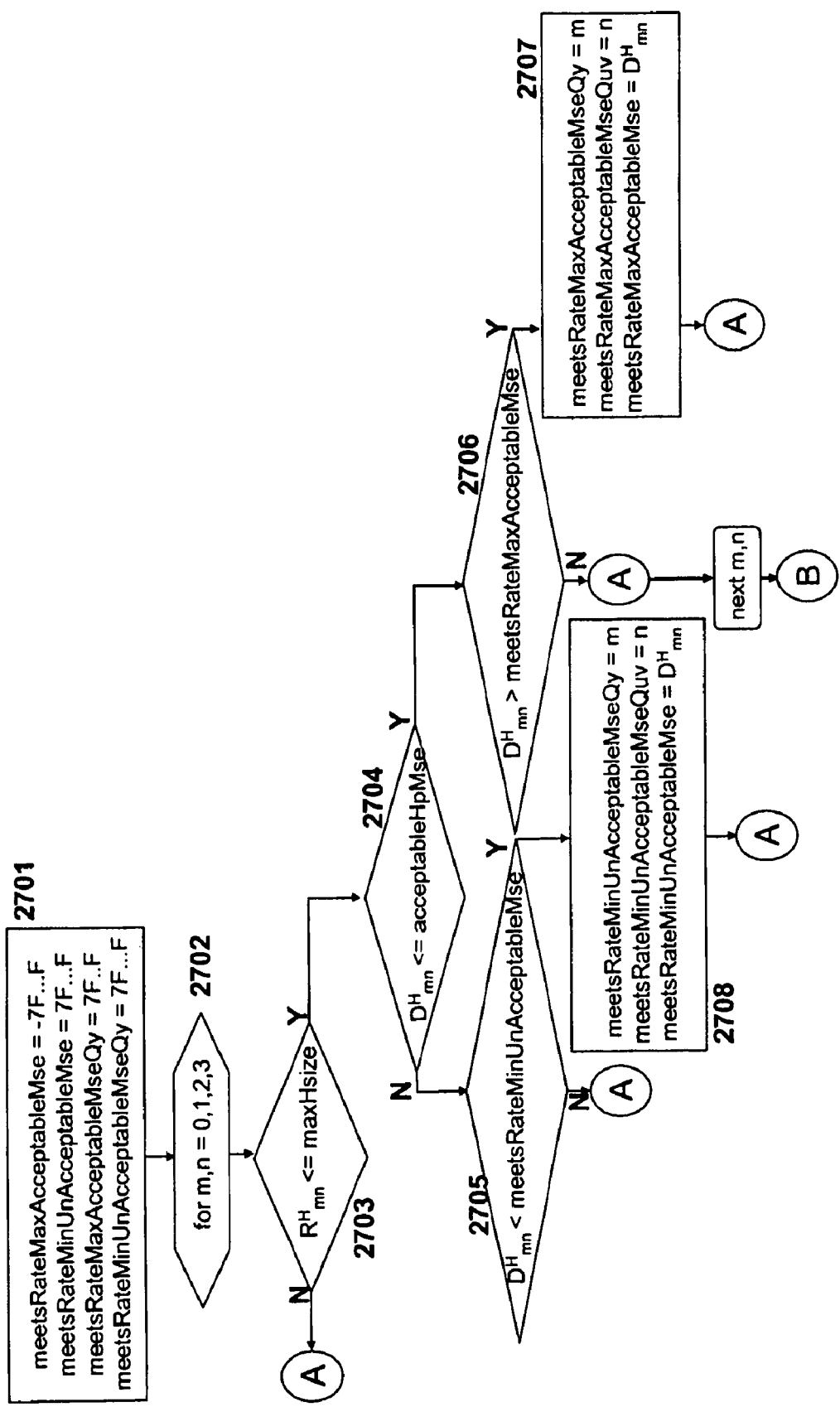
FIGS. 27 and 28 show a flowchart that illustrates a process executed during the horizontal blanking period to determine optimal highpass quantization settings, as an alternative to the process illustrated in FIG. 10.
Figure 28:
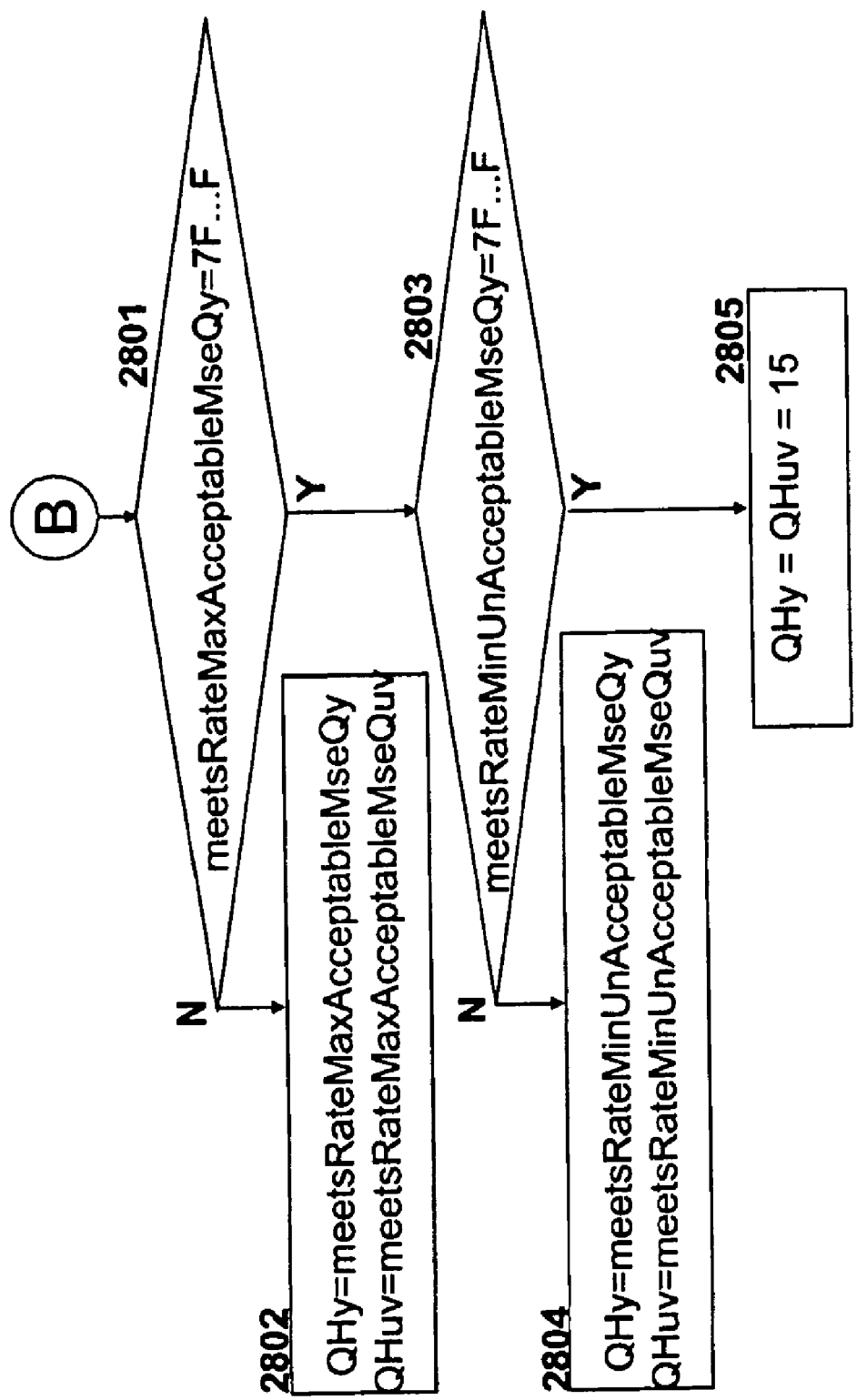

FIGS. 27 and 28 show an alternate flowchart which may be used instead of the flowchart in FIG. 10 to determine optimal highpass quantization settings during the horizontal blanking period. The alternate flowchart improves over the process of FIG. 10 because it allows the visual quality of the compressed line to be controlled directly. Note that this alternate flowchart is exactly analogous to the flowchart of FIGS. 25 and 26 which specified an alternate process to determine optimal lowpass quantization settings with direct control of visual quality. The alternate flowchart of FIGS. 27 and 28 accepts input parameters maxHsize and acceptableHpMse which specify, respectively, the maximum allowable size and the acceptable distortion of the highpass portion of the compressed line. After proceeding through steps exactly analogous to those in FIGS. 25 and 26, the process returns qHY and qHUV, the quantization-level combination which meets the desired bitrate requirement and has distortion closest to the acceptable threshold acceptableHpMse. If no such quantization-level combination exists (meetsRateMaxAcceptableMseQy is equal to 7F . . . F and meetsRateMinUnAcceptableMseQy is equal to 7F . . . F), then Step 2805 sets qHY=qHUV=15 as mentioned earlier while explaining FIG. 10.

Recall that the alternate processes of FIGS. 25, 26, 27, 28 allow the visual quality to be directly controlled. In particular, the specified thresholds acceptableLpMse and acceptableHpMse force the quantization levels to be raised if necessary so that the resulting distortion approaches the specified thresholds. We now explain how to determine these thresholds so that they correspond to the well understood Peak Signal to Noise Ratio (PSNR) quality metric.

The PSNR quality metric is defined as follows:

$$PSNR\ (\text{dB}) = 10\log_{10} 255^2/(MSE\text{perPixel}), \qquad (1)$$

(See "Video Coding—An Introduction to Standard Codecs" by M. Ghanbari, *IEE* 1999, Pg. 19), where MSEperPixel is the mean squared error per pixel. Therefore, $$MSE\text{perPixel} = 65025(PSNR/10)^{-10}, \qquad (2)$$

$$\text{tot}MSE\text{perLine} = (\text{numPixelsPerLine})(MSE\text{perPixel}), \qquad (3)$$

$$\text{tot}MSE\text{perLine} = (\text{numPixelsPerLine})(65025)(PSNR/10)^{-10}, \qquad (4)$$

where numPixelsPerLine and totMSEperLine are the number of pixels per line and the total mean squared error for all pixels in a line, respectively, From Equation (4), we can compute the total mean squared error associated with a specified PSNR quality. Now, if an approximately orthogonal wavelet transform is used to partition the input lines into lowpass and highpass subbands, then $$\text{tot}MSE\text{perLine} = \text{acceptableLpMse} + \text{acceptableHpMse}, \qquad (5)$$

where, acceptableLpMse and acceptableHpMse are acceptable mean squared errors in the lowpass and highpass subbands respectively. Empirical results show that good quality is obtained when acceptableHpMse is between 100 to 1000 times larger than acceptableLpMse. Hence, we combine Equations (4) and (5) to get $$(\text{numPixelsPerLine})(65025)(PSNR/10)^{-10} = \text{acceptableLpMse} + R(\text{acceptableLpMse}), \quad (6)$$

where $100 < R < 1000$. Thus, the specified distortion thresholds are directly related to the PSNR quality metric as follows:

$$\text{numPixelsPerLine})(65025)(PSNR/10)^{-10}(R+1)^{-1} = \text{acceptableLpMse}, \quad (7)$$

$$\text{numPixelsPerLine})(65025)(PSNR/10)^{-10} R(R+1)^{-1} = \text{acceptableHpMse}. \quad (8)$$

Finally, we explain how the PSNR quality setting can be used to enable different modes of operation. If channel conditions are expected to be good and video content is expected to be easily compressible, then we can derive acceptableLpMse and acceptableHpMse for PSNR=40 dB which results in excellent quality. Alternatively, by setting PSNR=infinity, we obtain acceptableLpMse=acceptableHpMse=0. In this case, the operation of the alternate process in FIGS. 25, 26, 27, 28 is identical to that of the FIGS. 7 and 10 because the quantization-level combinations with the lowest distortions are always selected. However, in actual operation, channel conditions often deteriorate and video content may be difficult to compress. Consequently, it is prudent to use a slightly lower PSNR, perhaps 35 dB, to derive acceptableLpMse and acceptableHpMse. With this setting, visual quality is still good although quantization settings will be slightly higher on easily compressible lines because such lines usually have low mean squared errors at low quantization levels. Hence the larger values of acceptableLpMse and acceptableHpMse associated with PSNR=35 dB will force higher quantizations to increase distortion to the acceptable thresholds associated with 35 dB. When coupled with the hardware-implemented method for improved video rate control in FIG. 23 this mode of operation results in superior performance, for the following reason. When easily compressible lines are encountered, the higher quantization levels result in smaller compressed line sizes. Therefore Step 2306, allocates more unused bytes to the register unused_bytes_accumulator. Hence subsequent lines which are difficult to compress are more likely to use low quantization levels and have good visual quality because unused_bytes_accumulator is less likely to get depleted.

Figure 11:
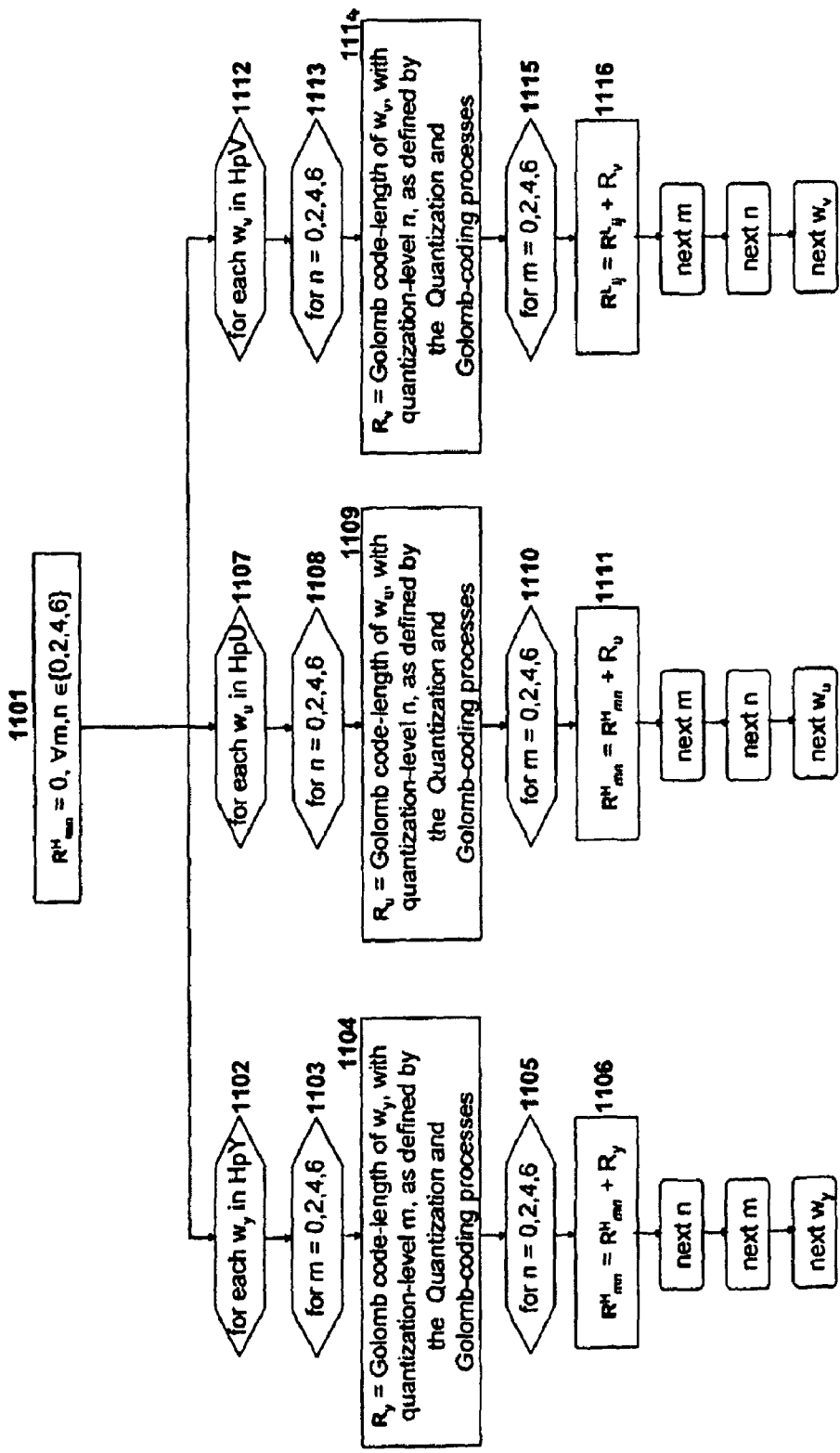
FIG. 11 shows a flowchart illustrating the computation of the coded length of the highpass portion of a line.

FIG. 11 shows a flowchart illustrating the computation of the coded length of the highpass portion of a line ($R^H_{mn}$). The Y-quantization level is m={0,2,4,6}, and the UV-quantization level is n={0,2,4,6}. As active pixels are clocked through the wavelet transform, the 16 values of $R^H_{mn}$ are accumulated in parallel from the wavelet coefficients $w_y$, $w_u$, $w_v$ as they become available in the HpY, HpU, HpV subbands, respectively.

Steps 1101 through 1116 are analogous to the respective Steps 801 through 816 in FIG. 8. The main difference is that Steps 1104, 1109 and 1114 do not involve the prediction process because highpass-subband encoding does not use prediction, as explained above in FIG. 3.

Figure 12:
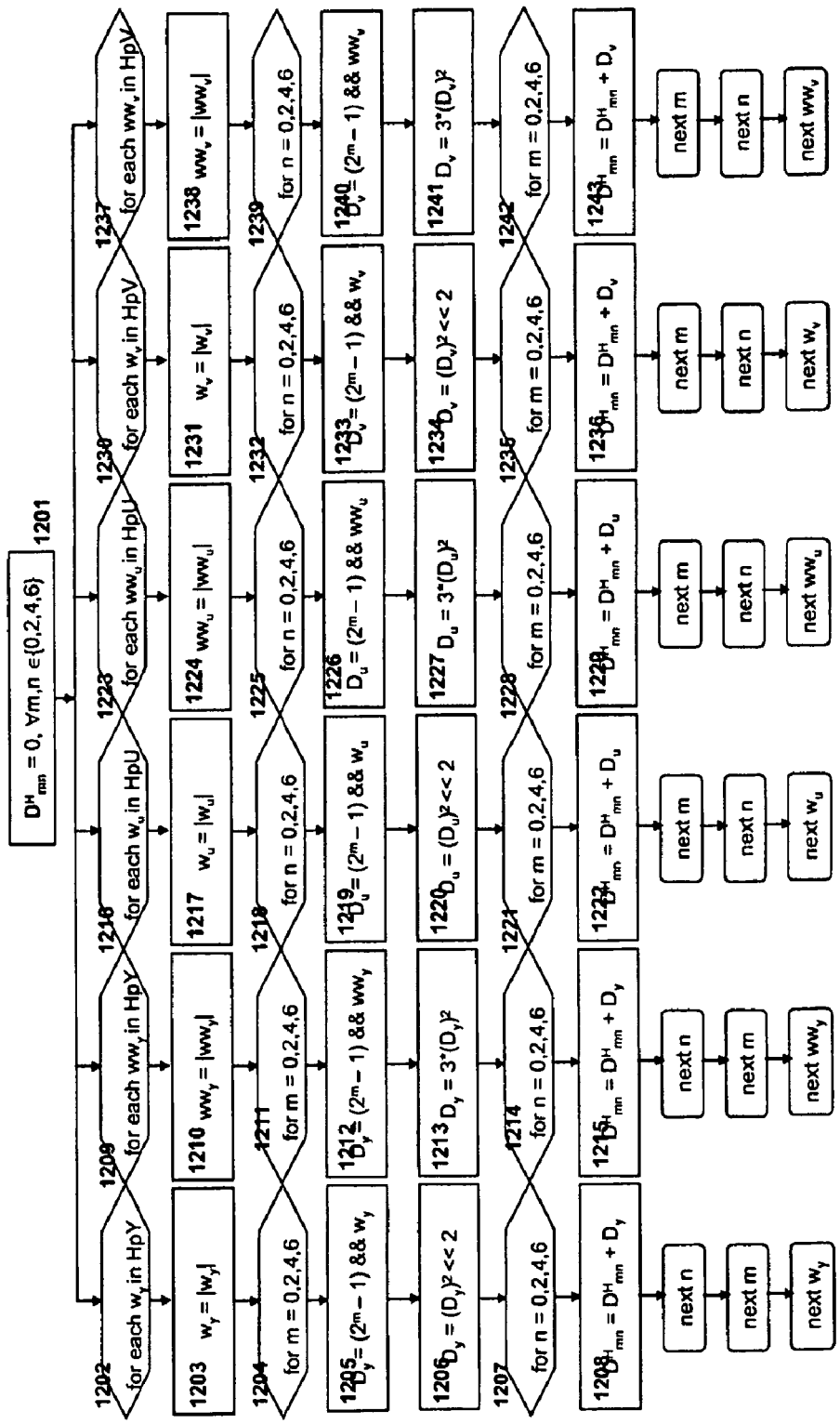
FIG. 12 shows a flowchart illustrating the computation of the squared error from the highpass portion of a line.

FIG. 12 shows a flowchart illustrating the computation of the squared error from the highpass portion of a line ($D^H_{mn}$). The Y-quantization level is m={0,2,4,6}, and the UV-quantization level is n={0,2,4,6}.

In this example, the 16 values of $D^H_{mn}$ are accumulated in parallel from the Daubechies-(7,9) Level-1 wavelet coefficients $w_y$, $w_u$, $w_v$ and the Level-2 wavelet-coefficients $ww_y$, $ww_u$, $ww_v$ as they become available in the HpY, HpU, HpV subbands, respectively. For the Daubechies-(7,9), the Level-2 coefficients are scaled by ¾ with respect to the Level-1 coefficients. This scaling is used for Daubechies-(7,9) wavelet-domain squared distortions to approximate pixel-domain squared distortions. For the LeGall-(5,3) transform, this scaling is unnecessary.

The detailed process in FIG. 12 is similar to that in FIG. 9. Step 1201 initializes all 16 highpass distortion registers to zero. Steps 1202 through 1208 operate on the Daubechies-(7,9) Level-1 wavelet coefficients $w_y$, and are analogous to Steps 902 through 908, where a difference is the scaling by 4 in Step 1206.

For $ww_y$, the Daubechies-(7,9) Level-2 wavelet coefficients, Steps 1209 through 1215 are analogous to Steps 1202 through 1208, with the exception that Step 1213 scales the Level-2 wavelet-domain distortion by 3. Thus Steps 1206 and 1213 scale the Level-2 coefficients by ¾ relative to the Level-1 coefficients.

Steps 1216 through 1229 operate on the LpU subband and are analogous to Steps 1202 through 1215. Similarly, Steps 1230 through 1243 operate on the LpV subband and are analogous to Steps 1216 through 1229.

Because scaling is unnecessary for the LeGall-(5,3) transform, FIG. 12 may also be used for distortion estimation under this wavelet transform using the following modifications. Steps 1206 and 1213 are changed to "$D_y=(D_y)^2$". Steps 1220 and 1227 are changed to "$D_u=(D_u)^2$". Steps 1234 and 1241 are changed to "$D_v=(D_v)^2$".

The following description is for an optimization that reduces the complexity of the lowpass subband rate computation. The lowpass rate computation is more complex than the highpass rate computation because, for the former computation, the prediction process is repeated at each quantization level.

To understand the impact of this repetition, the notation for the prediction process used above can be revised so that $a_n$, $b_n$, $c_n$, and $x_n$ denote quantizations of a, b, c, and x by n bits, respectively. It should be noted that $a_0$, $b_0$, $c_0$, and $x_0$ represent the original unquantized values a, b, c, and x.

The process begins by defining:

$$d_n(p, q) = p_n - q_n, \text{ for } p,q \in \{a, b, c, x\}$$

During the prediction process for Quantization-Level (QL) n, the first step is to compute $d_n(a,c)$, $d_n(a,b)$ and then define $$\min_n = b_n, \quad \text{if } |d_n(a, c)| \leq |d_n(a, b)|,$$
$$= c_n, \quad \text{otherwise},$$

where $\min_n$ is the minimum-distance a-neighbor at QLn.

Finally, the QLn residual is defined as:

$$dx_n = d(x_n, \min_n).$$

Previously, the code-length of $dx_n$ was re-computed by evaluating $d_n(a,c)$, $d_n(a,b)$, $\min_n$ and $dx_n$, for all QLn. These evaluations include two complement additions between $a_n$, $b_n$, $c_n$, and $x_n$, which can each be up to 14-bits long.

The following optimization demonstrates that there is usually only a need to evaluate $d_0(a,c)$, $d_0(a,b)$, $\min_0$ and $dx_0$. From there $d_n(a,c)$, $d_n(a,b)$, $\min_n$ and $dx_n$ can be derived for $n>0$. The derivations involve additions by 2-bit numbers and thus reduce the complexity of lowpass subband rate computation.

Figure 13:
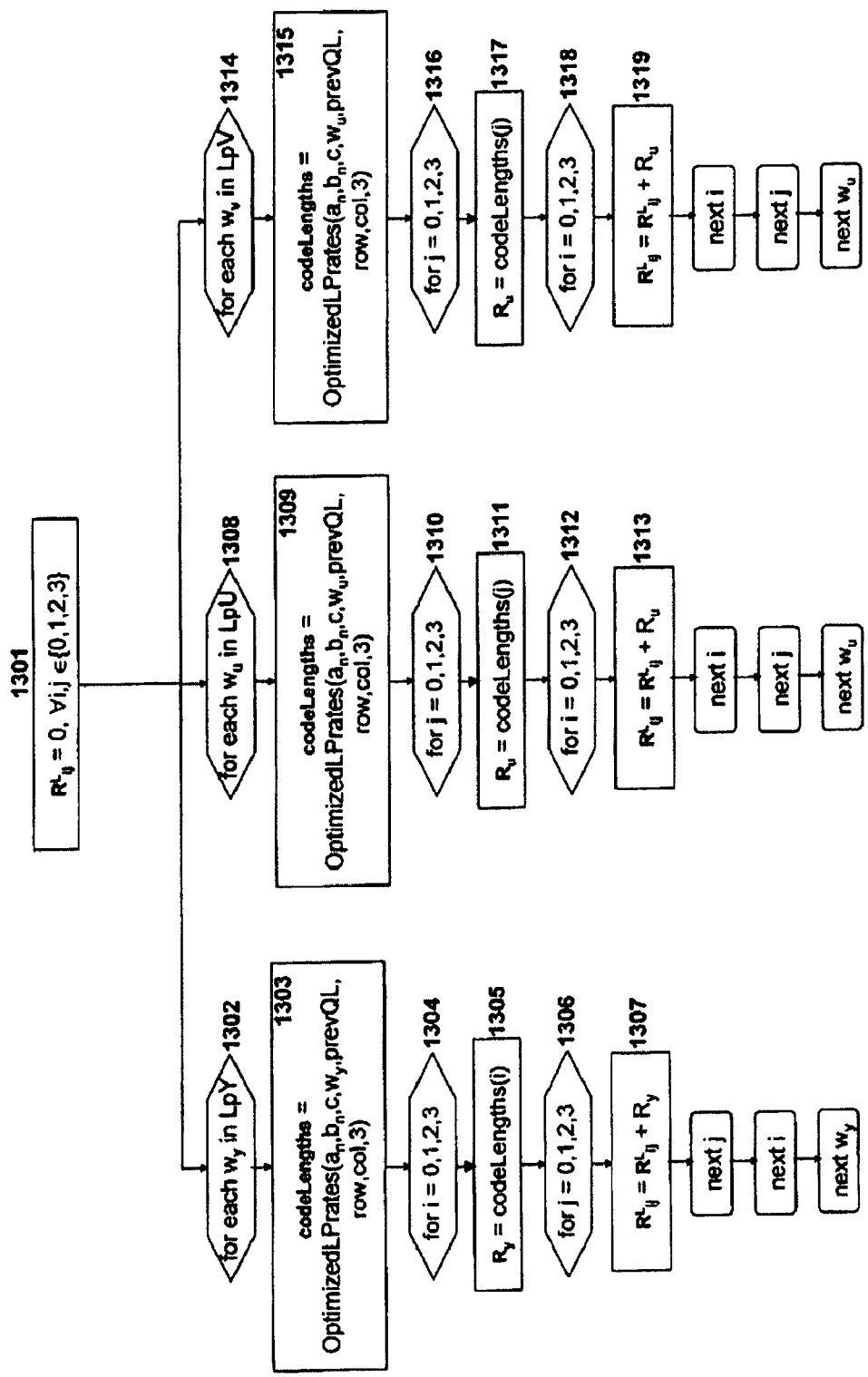
FIG. 13 shows the process for optimized lowpass subband rate computation.

FIG. 13 shows the process for optimized lowpass subband rate computation. This procedure is a modification of the one shown in FIG. 8 and relies on the OptimizedLPrates procedure explained below.

Figure 14:
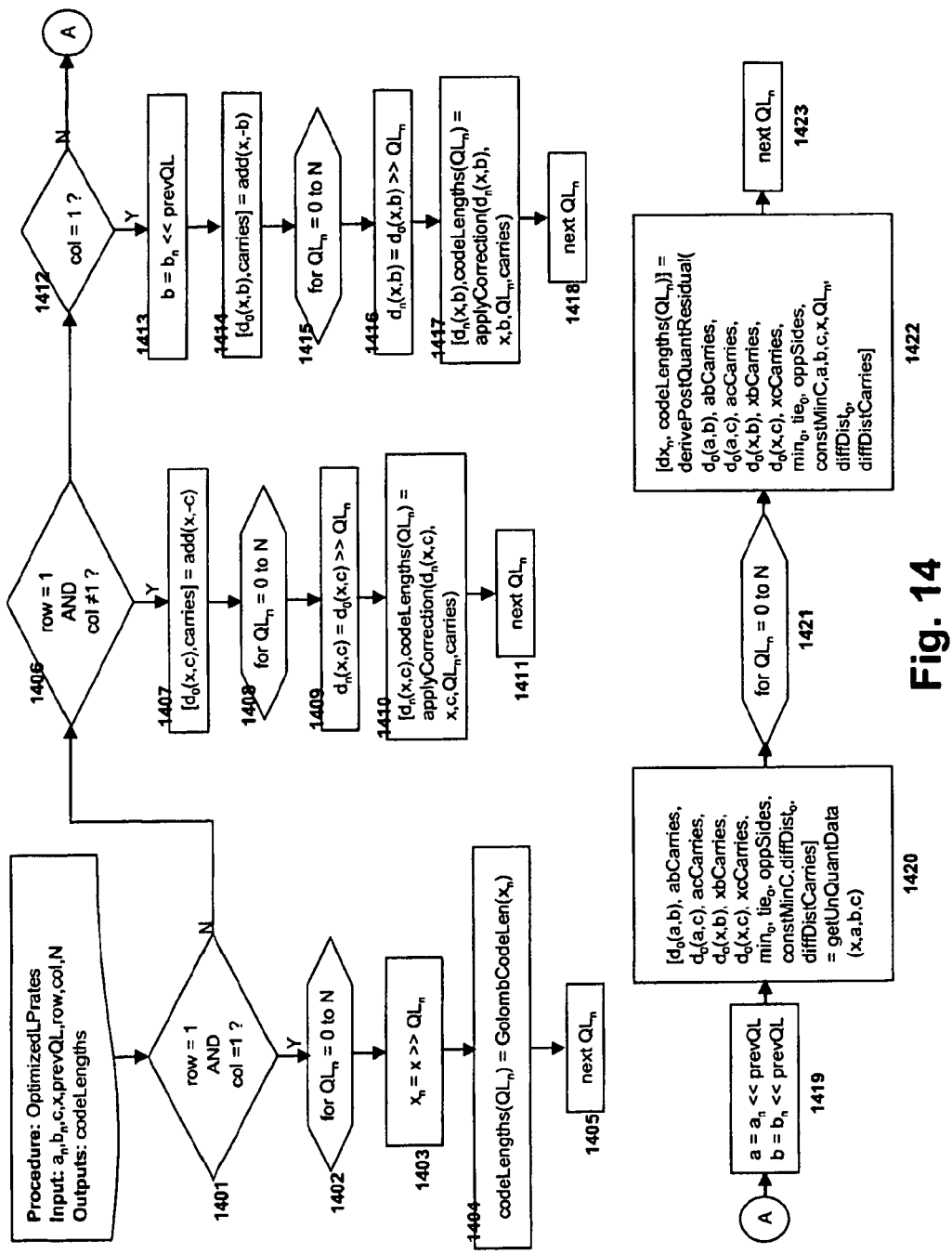
FIG. 14 describes the OptimizedLPrates procedure for optimized computation of the residual code-lengths for lowpass-subband entry x under all quantization-levels.

The flowchart in FIG. 14 describes the OptimizedLPrates procedure for optimized computation of the residual code-lengths for lowpass-subband entry x under all quantization-levels from 0 to N. The process uses the following inputs:

x, the lowpass-subband entry from the current row, $a_n$, $b_n$, the quantized upper-left and upper neighbors of x from the previous lowpass subband row, c, the unquantized left-neighbor of x from the current lowpass-subband row, prevQL, the quantization level used to quantize $a_n$ and $b_n$ in the previous lowpass subband row, row, col, the co-ordinates of x in the lowpass subband, N, the maximum quantization level for the current row.

The output from the process is the vector codeLengths containing the code lengths for the residual corresponding to x under all quantization levels from 1 to N. Initially, Step 1401 determines whether x is in the first row and first column of the lowpass subband. If so, then at all quantization levels the residual is obtained directly from the quantized value of x without prediction from any neighbors.

Therefore, Steps 1403, 1404 compute the code length at $QL_n$ as the Golomb code length of x rightshifted by $QL_n$. Recall that the Golomb code length is obtained by simple logic which determines the location of a most significant bit. Step 1402 causes Steps 1403, 1404 to repeat in order to obtain the code lengths of x under all quantization levels from 0 to N.

If Step 1401 determines that x is not on the first row and first column of the lowpass subband, Step 1406 checks whether x is on the first row of the lowpass subband. If so, then at all quantization levels, the residual would be predicted from the quantized value of x and its quantized left-neighbor $c_n$.

Figure 15:
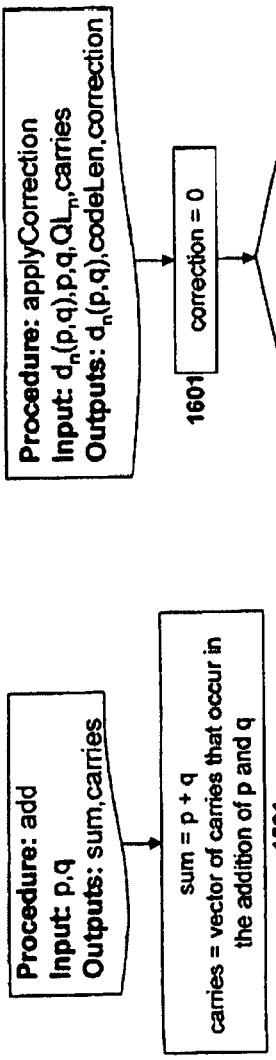
FIG. 15 depicts the procedure for adding the lowpass-subband entry from the current row with the unquantized left-neighbor of x from the current lowpass-subband row.

Step 1407 invokes the add procedure depicted in FIG. 15 to add −c to x and obtain $d_0(x,c)$ as well as the carries from the calculation which are used to derive $d_n(x,c)$ from $d_0(x,c)$.

Next, the loop in Steps 1408 to 1411 computes the code lengths of the residual corresponding to x under all quantization levels from 0 to N. To derive $d_n(x,c)$ from $d_0(x,c)$, Step 1409 rightshifts $d_0(x,c)$ by $QL_n$, and Step 1410 invokes the applyCorrection procedure in FIG. 16 to correct $d_n(x,c)$ by adding a correction term.

Figure 16:
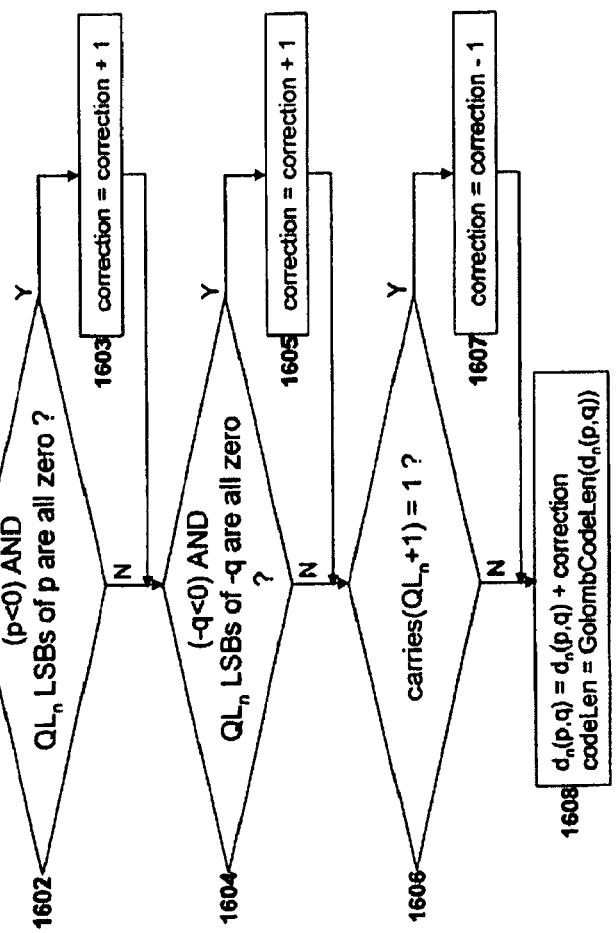
FIG. 16 shows the correction procedure for quantization input estimates.

The applyCorrection procedure in FIG. 16 accepts the following inputs:

p, q, integers, $QL_n$, the quantization level, $d_n(p,q)$, the estimated distance of q from p at $QL_n$. It is assumed that this estimate is computed by simply rightshifting $d_0(p,q)$ by $QL_n$, where $d_0(p,q)$ is obtained by applying the add procedure (FIG. 15) to p and −q.

carries, the vector of carries obtained from the add procedure in the previously described computation of $d_0(p,q)$.

The outputs from the applyCorrection procedure are:

$d_n(p,q)$, the corrected distance estimate of q from p at $QL_n$. This corrected distance estimate could be obtained by subtracting $q_n$ from $p_n$. However, this subtraction includes addition of two 14-bit numbers and is therefore more expensive than the proposed method which simply adds a two-bit correction term to $d_n(p,q)$.

codeLen, the Golomb code length of $d_n(p,q)$, correction, the correction term added to input $d_n(p,q)$.

Initially, Step 1601 initializes correction to 0. Recall that the quantization process treats certain negative numbers differently, to get shorter entropy codes. To correct the input estimate, the process accounts for this by detecting whether p (Step 1602) and −q (Step 1604) would be treated differently by the quantization process, and accordingly Steps 1603 and 1605 update the correction term.

Step 1606 determines whether the input estimate $d_n(p,q)$ contains a carry from the least significant bits that would be discarded in generating $q_n$ and $p_n$. If so, this carry should be incorporated into the correction term (Step 1607) because the carry would not be present in the direct subtraction of $q_n$ from $p_n$ since these quantized values would not have the least significant bits which would generate the carry.

Finally, Step 1608 adds the two-bit correction term to the input estimate $d_n(p,q)$ to get the corrected distance estimate. The Golomb code length of the corrected estimate is also computed.

Returning to FIG. 14, Step 1412 determines whether $x_0$ is on the first column but not on the first row. If so, then at all quantization levels the residual is predicted from the quantized value of x and its quantized upper-neighbor $b_n$. In this case, Step 1413 first leftshifts $b_n$ to get the full-precision b which is used to compute the distance from x. Then Steps 1413 to 1418 perform actions similar to Steps 1407 to 1410 except that b is used instead of c.

If Step 1412 determines that $x_0$ is neither on the first row nor on the first column, then at all quantization levels the residual is predicted from the quantized value of x and either its quantized upper-neighbor $b_n$ or its quantized left-neighbor $c_n$.

In this case, Step 1419 first leftshifts $a_n$ and $b_n$ to get the full-precision values which are used to compute the distance from x at $QL_0$. Next, Step 1420 uses the getUnquantData procedure (see FIG. 17) to collect data associated with the residual computed from unquantized entries x, a, b, c.

The loop in Steps 1421, 1423 repeat the derivePostQuantResidual procedure (Step 1422 and FIG. 18) to derive the code length for the residual at $QL_n$ from the data returned by the getUnquantData procedure.

To enable efficient determination of the code-length of $dx_n$ by the derivePostQuantResidual procedure (explained below), the getUnquantData procedure shown in FIG. 17 accepts the unquantized subband entry x, as well as a, b, c, the respective upper-left, upper and left x-neighbors, and outputs the following data:

$d_0(a,b)$ and $d_0(a,c)$, the a-distances of b and c as well as abCarries and acCarries, the respective carry vectors from these computations, $d_0(x,b)$ and $d_0(x,c)$, the x-distances of b and c as well as xbCarries and xcCarries, the respective carry vectors from these computations, $min_0$, a's closest neighbor, selected from {b,c}. If b and c are equidistant from a, then c is selected as the tie-breaker, $tie_0$ represents whether b,c are equidistant from a. Set to 1, if so. Otherwise, reset to 0, oppSides represents whether b and c are on opposite sides of a on the number line. Set to 1, if so. Otherwise, oppSides=0, constMinC represents whether c will remain the closest a-neighbor at all quantization levels. Set to 1, if so. Otherwise, reset to 0, diffDist0 is the difference between $d_0(a,b)$ and $d_0(a,c)$, while diffDistCarries are the carries generated in the computation of diffDist0.

First, Step 1701 invokes the add procedure from FIG. 15 to compute unquantized a-distances $d_0(a,b)$, $d_0(a,c)$ as well as the associated carries abCarries, acCarries. This step also initializes constMinC, oppSides and $tie_0$ to 0.

Step 1702 examines the signs of $d_0(a,b)$ and $d_0(a,c)$. If these signs are different, then b and c are on opposite sides of a on the number line. Step 1703 sets oppSides to store this information. Next, Step 1704 invokes the add procedure to compute the difference between $d_0(a,b)$ and $d_0(a,c)$, as well as diffDistCarries, the carries generated in the computation of diffDist0.

Step 1705 determines whether b, c are on opposite sides of a. If so, Step 1706 checks whether b and c are equidistant from a. If true, Step 1707 sets $tie_0$ and assigns the tie-breaker, c, to $min_0$.

If Step 1706 determines that b and c are not equidistant from a, then Step 1708 examines the signs of $diffDist_0$ and $d_0(a,c)$. If these signs are the same, then c is closer to a and $min_0$ is set to c (Step 1709). Otherwise, b is closer to a and b is assigned to $min_0$ in Step 1710.

Returning to Step 1705, if b, c are on the same side of a, Steps 1715 through 1719 set $tie_0$ and $min_0$ using logic similar to Steps 1706 through 1710. A substantial difference in the logic is the sign test in Steps 1708 and 1717. This test is different because sign polarities are dependent on whether b, c are on the same or opposite sides of a.

Following any of Steps 1707, 1709, 1710, 1716, 1718 or 1719, the variables $min_0$ and $tie_0$ are set appropriately, and the getUnquantData procedure is concluded with Steps 1711 and 1714 that call the add procedure from FIG. 15 to compute $d_0(x,b)$ and $d_0(x,c)$, the x-distances of b and c, as well as xbCarries and xcCarries, the respective carry vectors from these computations.

It should be noted that $d_0(x,c)$ does not need to be computed if Step 1712 determines that b, c are on the same side of a and the closest a-neighbor before quantization is the tie-breaking choice. This is a consequence of the order-preservation property which states that quantization by rightshifting is an order-preserving map.

Therefore, for any integers x, y, and natural number n, $$x \leq y => (x>>n) \leq (y>>n).$$

Specifically, this implies that, under the stated conditions, at all quantization levels, the relative ordering of a,b,c remains the same or degenerates such that b, c become equidistant from a. In either case, because c is the tie-breaking choice, the closest a-neighbor is c and thus remains the same at all quantization levels. Therefore, Step 1713 sets constMinC to indicate this situation.

Figure 18:
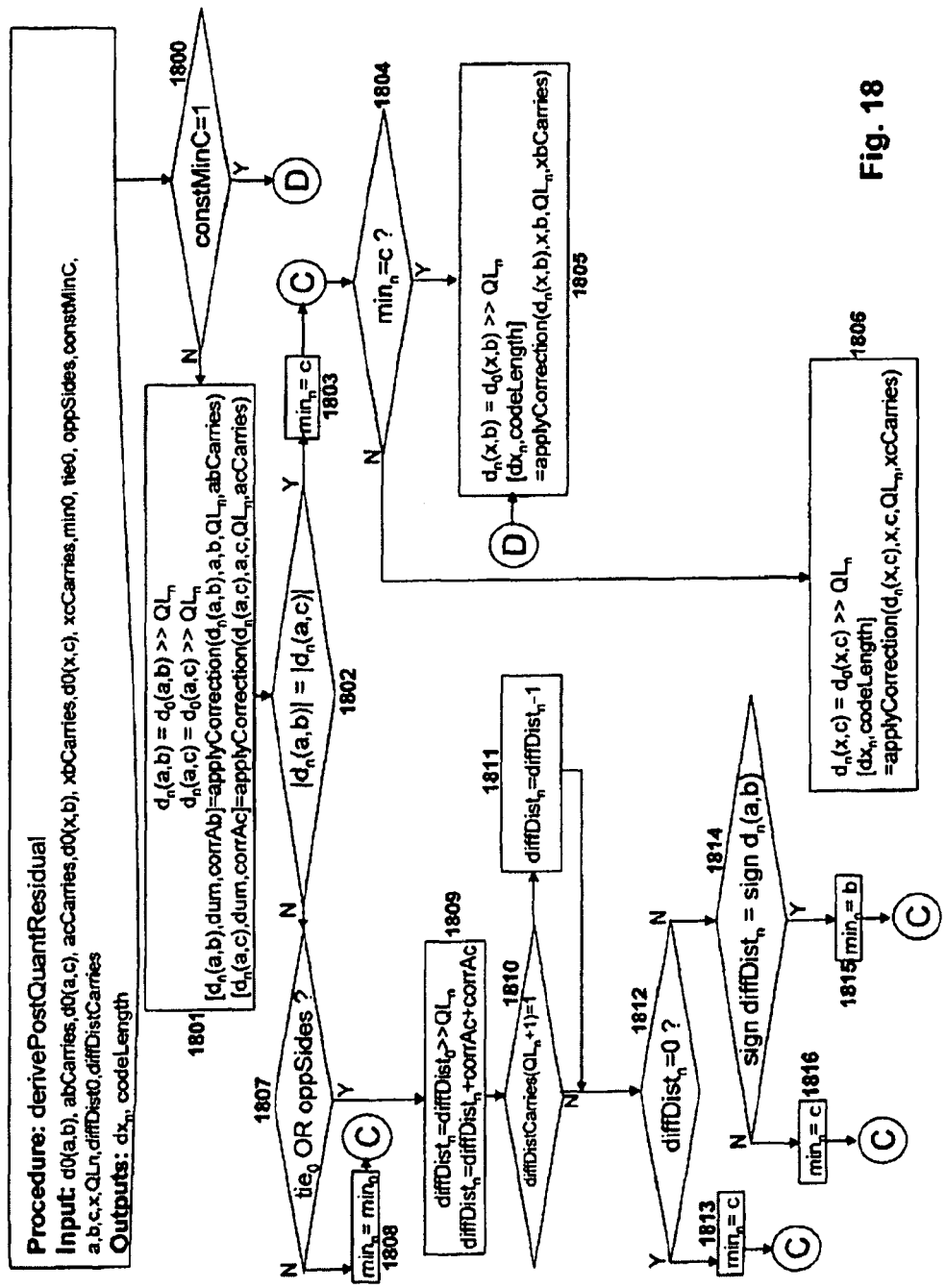
FIG. 18 shows the procedure for computing the residual corresponding to lowpass-subband entry x at a specified Quantization Level.

FIG. 18 shows the derivePostQuantResidual procedure for computing the residual corresponding to lowpass-subband entry x at specified $QL_n$, based on data provided by the getUnquantData procedure.

The following inputs are used:
$d_0(a,b)$ and $d_0(a,c)$, the a-distances of b and c as well as abCarries and acCarries, the respective carry vectors from these computations,
$d_0(x,b)$ and $d_0(x,c)$, the x-distances of b and c as well as xbCarries and xcCarries, the respective carry vectors from these computations,
$min_0$, a's closest neighbor, selected from {b,c}. If b and c are equidistant from a, then c is selected as the tie-breaker,
$tie_0$ represents whether b,c are equidistant from a. Set to 1, if so. Otherwise, reset to 0,
oppSides represents whether b and c are on opposite sides of a on the number line. Set to 1, if so. Otherwise, oppSides=0,
constMinC represents whether c will remain the closest a-neighbor at all quantization levels. Set to 1, if so. Otherwise, reset to 0,
diffDist0 is the difference between $d_0(a,b)$ and $d_0(a,c)$, while diffDistCarries are the carries generated in the computation of diffDist0,
$QL_n$, the specified quantization level.

These inputs are used to generate the following outputs:
$dx_n$, the residual corresponding to lowpass-subband entry x at specified $QL_n$,
codeLength, the Golomb code length of $dx_n$.

Step 1800 first examines constMinC to determine whether c is guaranteed to be the closest a-neighbor at all quantization levels. If so, then at $QL_n$, the residual will be predicted from $b_n$. This is done in Step 1805, without direct subtraction, by rightshifting $d_0(x,b)$ and invoking the applyCorrection procedure in FIG. 16.

If Step 1800 determines that c is not guaranteed to be the closest a-neighbor, Step 1801 rightshifts unquantized a-distances and corrects the results to obtain the a-distances after quantization without direct subtraction of quantized data. From these a-distances after quantization, the procedure first determines $min_n$, the closest a-neighbor after quantization.

If Step 1802 determines that the absolute values of $d_n(a,b)$ and $d_n(a,c)$ are equal, then $b_n$ and $c_n$ are equidistant from $a_n$. In this case, Step 1803 assigns the tie-breaker, c, to $min_n$. Otherwise, $b_n$ and $c_n$ are not equidistant from $a_n$.

If Step 1802 determines that a-distances are unequal after quantization, and Step 1807 determines b and c are on the same side of a and no tie occurred during the closest a-neighbor determination before quantization, then the closest a-neighbor after quantization is unchanged and therefore $min_0$ is assigned to $min_n$ (Step 1808). This is another consequence of the previously mentioned order-preservation property.

However, if the test in Step 1807 fails, there are two possibilities: 1) a-distances computed before quantization were equal, and they are unequal now, or 2) before quantization, b and c were on opposite sides of a. In the first case, the process has to determine the closest a-neighbor explicitly, because it cannot be assumed that it is the tie-breaking choice, c, from the unquantized data. In the second case, order-preservation is insufficient to guarantee an unchanged closest a-neighbor after quantization. So in this case too, the closest a-neighbor is determined explicitly.

In both cases, the closest a-neighbor may be determined efficiently without subtracting $d_n(a,b)$ from $d_n(a,c)$. To accomplish this, Step 1809 rightshifts $diffDist_0$, the difference between a-distances calculated from unquantized pixels, and obtains an estimate of the difference between $d_n(a,b)$ from $d_n(a,c)$. The estimate is corrected to the exact value $diffDist_n$ by first adding the correction factors corrAc and corrAb from Step 1801. Then $diffDist_n$ is decremented (Step 1811) if the discarded least significant bits from $d_0(a,c)-d_0(a,b)$ would have generated a carry in the full-precision $diffDist_0$ computation (Step 1810).

Following Step 1810, $diffDist_n$ contains the difference between a-distances after quantization. If Step 1812 determines this difference to be zero, then $b_n$, $c_n$ are equidistant from $a_n$, and Step 1813 assigns c, the tie-breaking choice, to $min_n$. Otherwise, because $b_n$, $c_n$ are on opposite sides of $a_n$, the signs of $diffDist_n$ and $d_n(a,b)$ reveal whether $b_n$ or $c_n$ is the closest $a_n$-neighbor (Step 1814). Accordingly Step 1815 or Step 1816 assigns the correct value to $min_n$.

Finally, after any of Steps 1803, 1808, 1813, 1815 or 1816, the result is $min_n$, the closest $a_n$-neighbor after quantization. The process can now derive the residual corresponding to $x_n$ by prediction from $min_n$, without using direct subtraction.

Specifically, if Step 1804 determines that $min_n$ is c, Step 1805 rightshifts $d_0(x,b)$ and invokes the applyCorrection procedure (FIG. 16) to get $dx_n$ and its Golomb code length in codeLength. If $min_n$ is b, Step 1806 performs the same actions using $d_0(x,c)$ instead of $d_0(x,b)$.

To illustrate the advantage of the OptimizedLPrates procedure in FIG. 14, the following example compares it to the unoptimized prediction process that would have to be repeated for each $QL_n$, for n in $\{0, \ldots, N-1\}$.

Denoting an adder with input bitwidths of m, n bits as an (m+n)-adder, at $QL_n$, the unoptimized process includes four [(N−n)+(N−n)] adders. Therefore, the entire prediction process for n in $\{0, \ldots, N-1\}$ would include four of each of the following: (1+1)-adder, (2+2)-adder, (3+3)-adder, . . . , (N+N)-adder.

In contrast, in FIG. 14, steps 1403, 1404, 1407, 1413, 1416, and 1417 can use multiplexers to share the logic included in Steps 1422 and 1420. Therefore, it is sufficient to analyze the hardware requirements for Steps 1422 and 1420.

Figure 17:
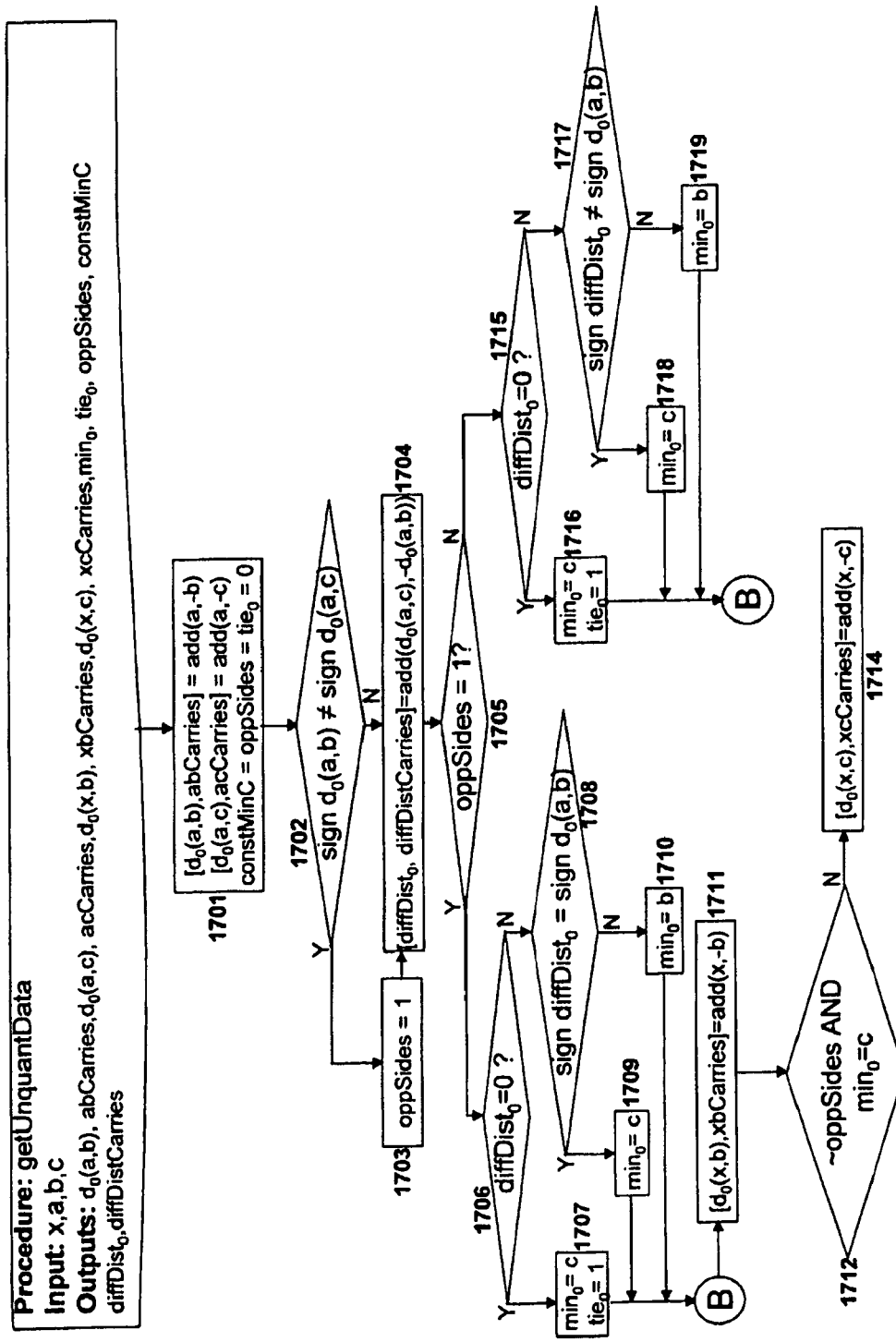
FIG. 17 shows the procedure determining distances between pixels after they have been quantized.

The getUnQuantData procedure in FIG. 17 includes five (N+N)-adders (Steps 1701, 1702, 1704, 1711, and 1714). The derivePostQuantResidual procedure from FIG. 18, at $QL_n$, includes four [(N−n)+2] adders (Steps 1801, 1809, 1805, and 1806).

Therefore, for all $QL_n$, with n in $\{0, \ldots, N-1\}$, the optimized process includes five (N+N)-adders and four of each of the following: (1+1)-adder, (2+2)-adder, (3+2)-adder, . . . , ((N−1)+2)-adder. Assuming serial adders are used for both implementations, an (N+N)-adder has 4N−8 more gates than an (N+2)-adder. For N=14, the optimized implementation includes 1320 gates while the unoptimized implementation includes 2296 gates. Therefore, the optimization provides at least a 42.51% savings in logic gates.

The following describes a method to improve the distortion estimates for the lowpass and highpass portions of a line, as depicted in FIGS. 9 and 12. Recall that these distortions are actually wavelet-domain distortions.

The integer implementations of the wavelet transforms are approximately orthogonal so that wavelet-domain distortions are approximately equal to the actual pixel-domain distortions. (See "Optimal Quantized Lifting Coefficients for the 9/7 Wavelet"—S. Barua, K. A. Kotteri, A. E. Bell and J. E. Carletta, *Proceedings of the 2004 IEEE International Conference on Acoustics, Speech and Signal Processing.*) However, the rounding noise introduced by the integer implementation of the inverse wavelet transform decreases the accuracy of the wavelet-domain distortion estimates computed in FIGS. 9 and 12.

To mitigate this problem, one should observe that the rounding noise mainly affects the Least-Significant Bits (LSBs) of the wavelet coefficients because these are the bits which are rounded in the integer inverse wavelet transform. Therefore, during the decoding process, an embodiment of the present invention uniformly scales the inverse quantized wavelet coefficients by left-shifting them N bits (N=1, 2 or 3), just before the inverse wavelet transform. This sets the N LSBs to zero and suppresses rounding noise in the integer inverse wavelet transform, improving the accuracy of the wavelet-domain distortion estimates. After the inverse-wavelet transform, the reconstructed pixels should be rightshifted by N bits to invert the uniform scaling.

The improved distortion-estimation accuracy was confirmed by measuring the Y-component distortion-estimation percentage error on each line of the first frame of the standard mobile video sequence, with and without scaling, for Daubechies-(7,9) and LeGall-(5,3) wavelet transforms with qHpY in $\{3,4,5,6,7\}$. Next, the mean and maximum percentage errors were calculated over all lines. Table 2 shows the tabulated the reductions in percentage errors.

TABLE 2

| qHpY | Wavelet | % mean-error reduction after scaling | % max-error reduction after scaling |
|---|---|---|---|
| 3 | D79 | 5 | 5 |
| 4 | D79 | 2 | 2 |
| 5 | D79 | 0 | 2 |
| 6 | D79 | 0 | −1 |
| 7 | D79 | 0 | 0 |
| 3 | L53 | 9 | 10 |
| 4 | L53 | 5 | 7 |
| 5 | L53 | 1 | 0 |
| 6 | L53 | 0 | 1 |
| 7 | L53 | 0 | 1 |

As can be seen in the table, the scaling reduces the distortion-estimation errors, especially at lower quantization levels, where rounding noise tends to dominate over quantization noise.

The following method is used to improve the performance of the entropy encoders 319-324 shown in FIG. 3. Recall that these entropy encoders were implemented using the simple yet efficient Golomb codes which assume that the data is exponentially distributed. Arithmetic encoders achieve higher compression ratios than Golomb encoding if the true distribution of the data is known. (See "Elements of Information Theory"—T. Cover and J. Thomas, Wiley 1991, Pg. 104.)

In the prior art, arithmetic encoders and decoders employ estimates of the data distribution. These estimates are usually initialized to the uniform distribution and gradually converge toward the actual underlying distribution. Because the convergence is slow, the average compression ratio achieved is not much better than that from a Golomb coder. In fact, to obtain superior performance, arithmetic encoders typically employ computationally complex context-adaptive methods (for example, see "Study of final committee draft of joint video specification ITU-T Rec. H.264|ISO/IEC 14496-10 AVC"—T. Wiegand, December 2002, *Awaji MPEG Meeting*). However, the method described below shows how arithmetic encoding can be used to improve the performance of an entropy encoder based on Golomb codes.

On the first line, the encoder uses Golomb coding to encode the line as described above. Accordingly, the decoder uses Golomb decoding to decode this line. On Line n, where n>1, the encoder computes the histogram of Line (n−1) as an estimate of the distribution of data on Line n. This estimate is used for arithmetic encoding of Line n, which uses $B_a$ bits.

In parallel, the encoder also generates the Golomb encoding of Line n, which uses $B_g$ bits. If $B_a < B_g$, the encoder sets a control bit and transmits the arithmetic encoding of Line n. Otherwise, the control bit is reset and the Golomb encoding of the line is transmitted.

Correspondingly, for Line n, the decoder examines the control bit transmitted by the encoder. If this bit is set, the decoder uses the histogram of Line (n−1) as the estimated distribution for arithmetic decoding of Line n. If the control bit is reset, the decoder applies Golomb decoding to recover Line n.

The compression ratio achieved by this scheme is always greater than or equal to that from a Golomb encoder. In practice, the histogram of Line (n−1) is usually a good estimate for the distribution of Line n, because video data is highly correlated along the vertical axis. The correlation decreases at horizontal edges, but at these lines, the encoder would automatically switch to Golomb encoding.

The following optimization reduces the number of bits in the low-priority packets described in FIG. 5. Recall that these packets are obtained by entropy encoding the quantized highpass channels HpY, HpU, HpV in FIG. 3. The Golomb coder performs well if the underlying data is exponentially distributed so that the majority of wavelet coefficients are clustered around zero while a minority has large values. These large coefficients will have long Golomb codes and thus lower the compression ratio.

Large wavelet coefficients in the highpass channels HpY, HpU, HpV correspond to vertical edges at corresponding locations in the respective Y, U, V channels. These vertical edges also result in discontinuities in the respective lowpass channels LpY, LpU, LpV. Therefore, by processing the lowpass channels with a vertical edge detector, the vertical edges in the highpass channels can be predicted (See "Digital Image Processing using Matlab" by R. Gonzalez, R. Woods and S. Eddins, Prentice Hall 2004). Subtracting the predicted vertical edges from the highpass channels produces residual highpass channels in which vertical edges are suppressed. Thus, the residual highpass channels have fewer large-valued wavelet coefficients, and the resulting low-priority packets consumer a smaller number of bits.

To decode these low priority packets, the decoder first decodes the LpY, LpU and LpV channels as well as the residual highpass channels. Next, the LpY, LpU and LpV channels are processed with the vertical edge detector, and the predicted vertical edges are added to the residual highpass channels to obtain the highpass channels HpY, HpU and HpV. The decoding process then continues as described previously.

Figure 19:
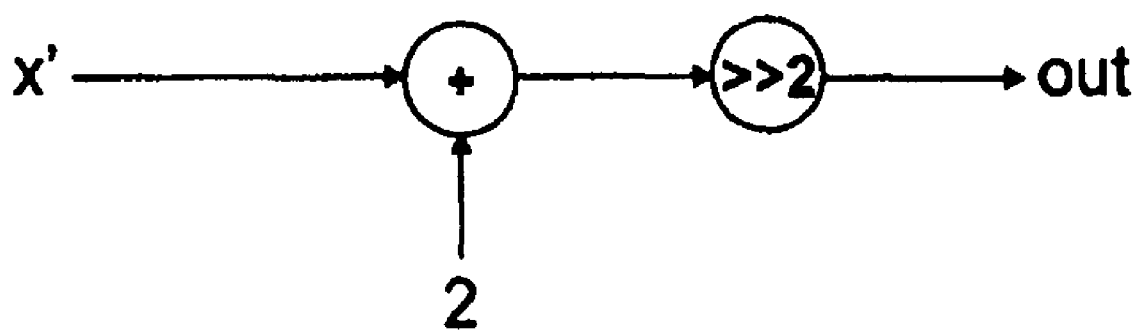
FIG. 19 shows a rounding method for integer implementation of the LeGall-(5,3) wavelet transform using floor(x'+2) as defined by the JPEG-2000 image compression standard.

The following is a description of a new rounding method for the integer implementation of the LeGall-(5,3) wavelet transform in FIG. 3. As defined in the JPEG-2000 image compression standard, the update step of the LeGall-(5,3) wavelet transform rounds x, using floor(x+0.5), where x is an integer multiple of 0.25 and floor(y) returns the largest integer that is smaller than the real number y. (See Equation 16 in "An Overview of the JPEG-2000 Still Image Compression Standard" by M. Rabbani and R. Joshi, *Signal Processing: Image Communication* 17 (2002) 3-48.) Values of x in [−0.5,0.5) are mapped to zero by floor(x+0.5). In a hardware implementation, x and 0.5 will be converted to integers by multiplying them by 4 to get x'=4x and 2=4*0.5. With this representation, FIG. 19 shows how floor(x'+2) is implemented as defined in the JPEG-2000 image compression standard.

Figure 20:
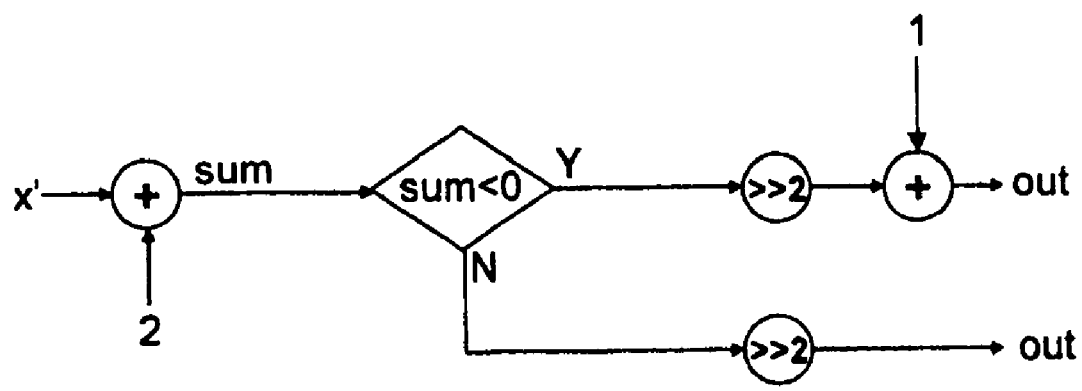
FIG. 20 shows a rounding method for integer implementation of the LeGall-(5,3) wavelet transform using fix(x'+2) in accordance with an embodiment of the present invention.

Now consider the rounding method described by fix(x+0.5) where fix(y) returns the integer which is closest to y and also is in between y and zero. Observe that values of x in (−1.5,0.5) are mapped to zero by fix(x+0.5). In a hardware implementation, x and 0.5 will be converted to integers by multiplying them by 4 to get x'=4x and 2=4*0.5. With this representation, FIG. 20 shows how fix(x'+2) is implemented. In the inverse wavelet transform, FIG. 20 is easily reversed by the usual inverse lifting procedure.

FIG. 20 has an additional sign check on sum as well as an extra addition by 1. However, as described earlier, fix(x+0.5) maps (−1.5, 0.5) to zero, whereas floor(x+0.5) maps [−0.5, 0.5) to zero. Therefore, fix(x+0.5) maps the values {−1.25, −1.0, −0.75, −0.5, −0.25, 0, 0.25} to zero, whereas floor(x+0.5) maps the values {−0.5, −0.25, 0, 0.25} to zero. Recall that the entropy encoder in FIG. 4 assigns the shortest length-1 code to zero values. Therefore, a wavelet transform that uses JPEG-2000 floor(x+0.5) for rounding after the update step will map four values to the length-1 code. In contrast, the proposed fix(x+0.5) rounding would map seven values to the length-1 code. Because the fix(x+0.5) rounding maps more values to the shortest entropy code of length-1, lossless encoding using a wavelet transform with fix(x+0.5) rounding provides greater compression ratios than a wavelet transform using JPEG-2000 floor(x+0.5) rounding.

Table 3 confirms this expectation. The first column shows compression ratios for 38 different images compressed losslessly with fix(x+0.5) rounding, and the second column shows the compression ratios obtained when floor(x+0.5) rounding is used. For all 38 images, fix(x+0.5) rounding provides greater compression ratios than floor(x+0.5) rounding. As pointed out above, the additional hardware cost for fix(x+0.5) rounding compared to floor(x+0.5) is very small. It should be emphasized that the benefit from fix(x+0.5) rounding is not due to the deadzone quantization effect (See "Video Coding—An Introduction to Standard Codecs" by M. Ghanbari, *IEE* 1999, Pg. 26). In particular, a deadzone is used in lossy coding to increase a quantizer's zero-bin width. However, fix(x+0.5) rounding occurs in the wavelet transform and provides an advantage even for lossless coding which does not use a quantizer.

TABLE 3

| fix(x + 0.5) | floor(x + 0.5) |
| --- | --- |
| 1.5424 | 1.5406 |
| 1.6538 | 1.6515 |
| 1.8659 | 1.8628 |
| 2.0042 | 1.9997 |
| 2.0772 | 2.0722 |
| 1.431 | 1.4282 |
| 1.9745 | 1.9683 |
| 1.9566 | 1.9529 |
| 1.3535 | 1.3527 |
| 2.293 | 2.2872 |
| 1.2679 | 1.2658 |
| 2.211 | 2.2068 |
| 1.7756 | 1.7728 |
| 1.7979 | 1.7954 |
| 1.5603 | 1.5573 |
| 5.7696 | 5.7608 |
| 5.0637 | 5.0536 |
| 4.5117 | 4.501 |
| 2.3584 | 2.3559 |
| 2.0432 | 2.0413 |
| 1.8649 | 1.8627 |
| 1.8429 | 1.8413 |
| 2.7209 | 2.7166 |
| 2.5593 | 2.5568 |
| 2.4541 | 2.4509 |
| 2.4208 | 2.4187 |
| 3.6332 | 3.6242 |
| 3.367 | 3.3621 |
| 3.2681 | 3.2629 |
| 3.178 | 3.175 |
| 2.8535 | 2.8471 |
| 2.4386 | 2.4333 |
| 2.2138 | 2.2087 |
| 2.2368 | 2.2322 |
| 3.7582 | 3.7466 |
| 3.4464 | 3.4363 |
| 3.3439 | 3.3355 |

The final optimization concerns a method to improve video rate-control performance. The description of FIG. 6 above states that maxLsize 601, maxHsize 602, ByPass 603, SelectYuv 604 and SelectTfm 605 are obtained by using a channel-capacity estimate to index into a table that provides the values of these control signals. In practice, channel-capacity estimates are sometimes unreliable, and robustness can be improved by not using channel-capacity estimates directly for video rate control.

TABLE 4

| Index | Lowpass CR | Highpass CR | SelectYuv | SelectTfm | ByPass | Worst-Case CRs |
|---|---|---|---|---|---|---|
| 1 | 1 | 1 | 4:4:4 | L53 | 1 | 1 |
| 2 | 1 | 2 | 4:4:4 | L53 | 0 | 1.6 |
| 3 | 1 | 3 | 4:4:4 | L53 | 0 | 2 |
| 4 | 1 | 2 | 4:2:2 | L53 | 0 | 2.4 |
| 5 | 1 | 3 | 4:2:2 | L53 | 0 | 3 |
| 6 | 1 | 2 | 4:1:1 | L53 | 0 | 3.2 |
| 7 | 1 | 3 | 4:1:1 | L53 | 0 | 4 |
| 8 | 1 | 4 | 4:1:1 | L53 | 0 | 4.571428571 |
| 9 | 1 | 5 | 4:1:1 | L53 | 0 | 5 |
| 10 | 1.5 | 6 | 4:1:1 | D79 | 0 | 6.857142857 |
| 11 | 1.5 | 7 | 4:1:1 | D79 | 0 | 7.304347826 |
| 12 | 1.5 | 8 | 4:1:1 | D79 | 0 | 7.68 |

To illustrate the method Table 4 shows 12 settings for the video rate control signals. The Lowpass CR and Highpass CR refer to targeted compression ratios for the lowpass and highpass subbands. These quantities are related to maxLsize and maxHsize by:

$$\text{max}L\text{size} = \text{uncompressed\_lowpass\_subband\_size}/\text{Lowpass}CR,$$

$$\text{max}H\text{size} = \text{uncompressed\_highpass\_subband\_size}/\text{Highpass}CR,$$

where the uncompressed subband sizes can be calculated directly using the input resolution and the 1:3 ratio between lowpass and highpass subband sizes.

The Worst-Case CRs column shows the minimum compression ratio that would be obtained using the given settings, by accounting for the lowpass and highpass compression ratios as well as the YUV format. These worst-case CRs are plotted by points 2161-2172 on curve 2160 in FIG. 21, with arbitrary Peak Signal-to-Noise Ratio (PSNR) values. However, when actual images are processed using the 12 settings, the compression ratios and PSNRs are usually higher than the worst-case curve. For example, on the standard mobile image, the 12 settings represented by points 2141-2152 produce curve 2140 in FIG. 21. Similarly, applying the 12 settings to the gfx (points 2121-2132) and wq images (points 2101-2112) result in curves 2120 and 2100 respectively, in FIG. 21. Curve 2100 corresponds to an image that is much easier to compress than the image associated with curve 2140; hence points on curve 2100 have higher PSNRs and CRs than corresponding points on curve 2140.

Figure 22:
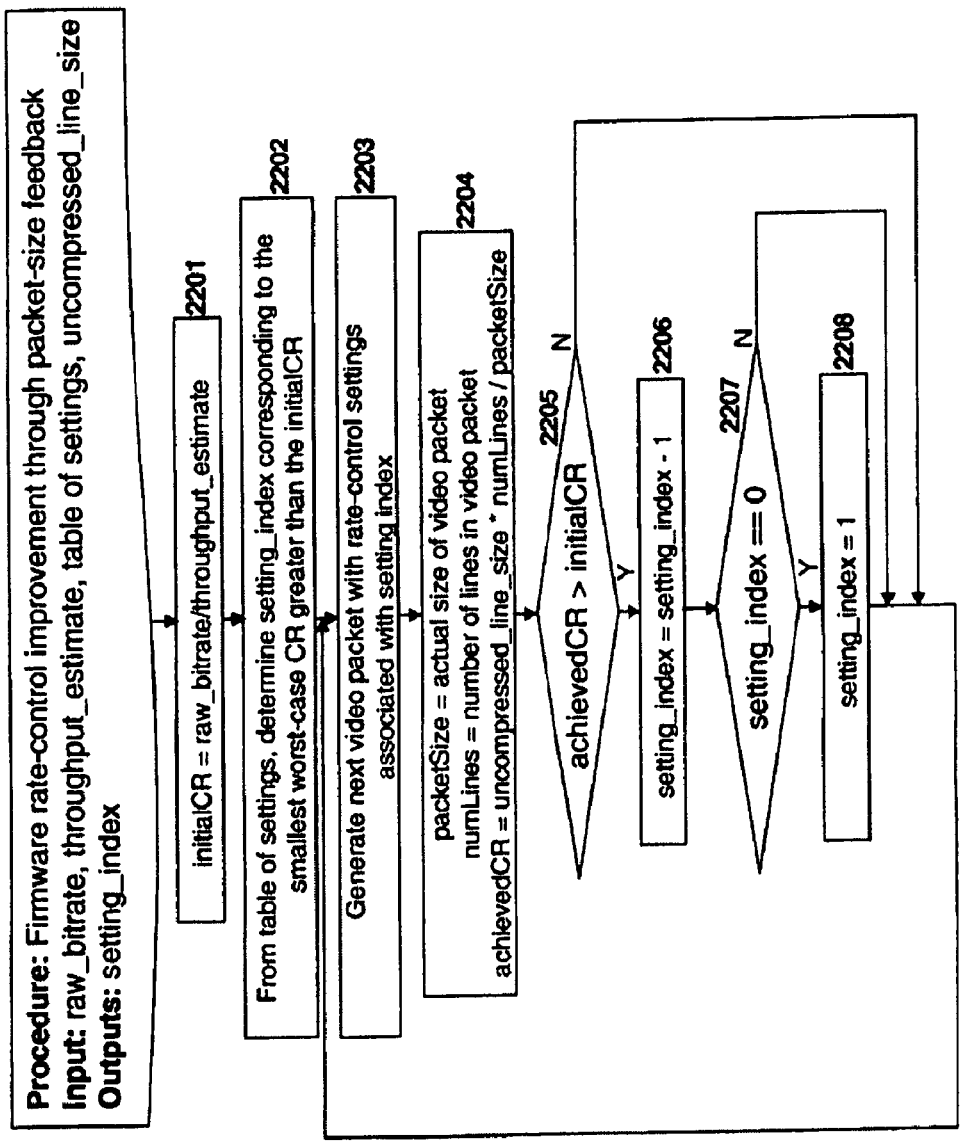
FIG. 22 is a flowchart illustrating a firmware-implemented method for improved video rate control in accordance with an embodiment of the present invention.

FIG. 22 is a flowchart illustrating a firmware-implemented method for improved video rate control in accordance with an embodiment of the present invention. This method uses feedback on compressed packet size to improve rate control performance by detecting over-compression.

The process depicted in FIG. 22 can be explained via the example of transmitting XGA video (1024×768@60 Hz). This video format requires a raw bitrate of 1132 Mbps. When transmission begins, the system obtains a throughput estimate of 525 Mbps from the MAC. Therefore, the initial CR should be greater than 1132/525=2.16 (Step 2201). From the Worst-Case CRs, Setting #4 is selected to obtain the smallest worst-case CR which is greater than the initial CR (Step 2202). The next video packet is generated with the rate control operating at Setting #4 (Step 2203).

Figure 21:
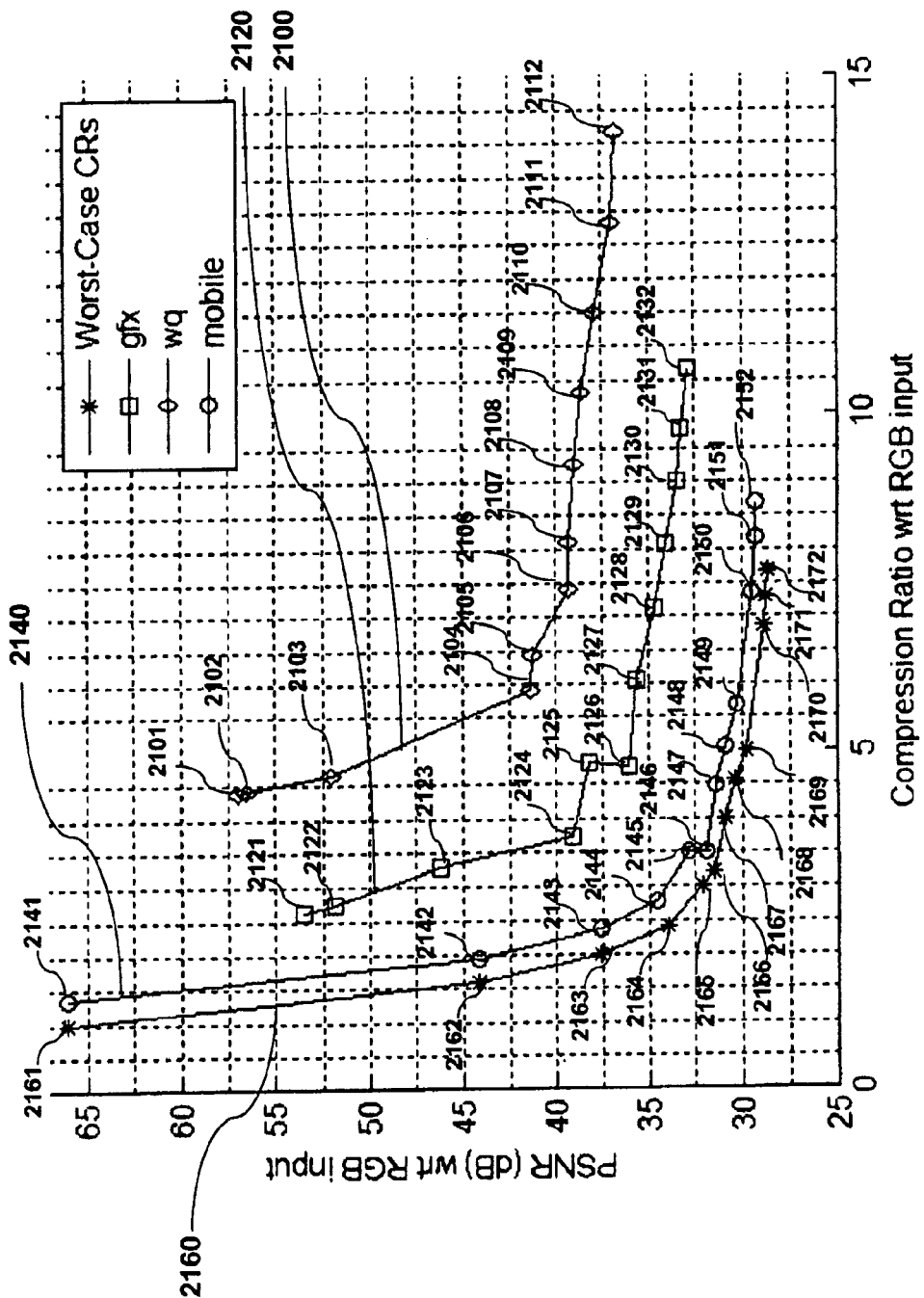
FIG. 21 plots a curve of compression ratios used for video rate control signals.

If the video content is similar to the gfx image, then Setting #4 will cause the system to operate at point 2124 on the gfx curve 2120 in FIG. 21. Therefore, the average CR would be greater than 3.5, which is much larger than the initial CR=2.16. By monitoring the size of the compressed video packets (Step 2204), this condition can be detected (Step 2205) to confirm that the compression is higher than necessary because the content is relatively easy to compress. On detecting such a condition, the system decreases the setting index to 3 to operate at point 2123 on the gfx curve 2120 with CR>3 (Step 2206).

The process will repeatedly detect over-compressed conditions (step 2207) and continue decreasing the setting index until it reaches point 2121 on the gfx curve 2120 with CR>2.5 in FIG. 21 (step 2208). Moving from point 2124 to point 2121 on the gfx curve 2120 increases the PSNR from about 38 dB to about 57 dB, while ensuring that the CR is greater than the initial CR.

Figures 23, 24:
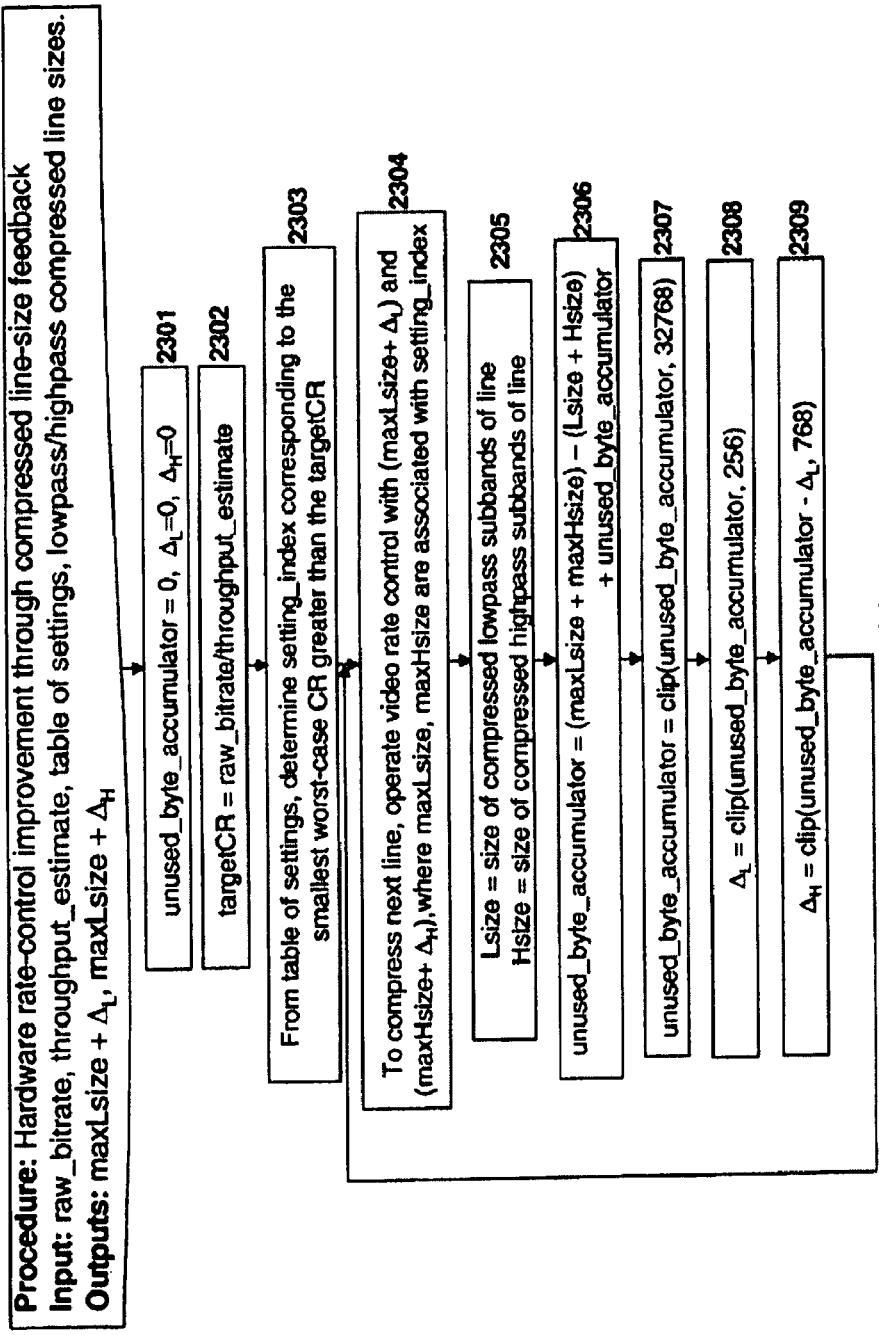
FIG. 23 is a flowchart illustrating a hardware-implemented method for improved video rate control in accordance with an embodiment of the present invention.
FIG. 24 depicts a clip function used to clip unused bytes in the register.

FIG. 23 is a flowchart illustrating an alternate, hardware-implemented method for improved video rate control in accordance with an embodiment of the present invention. This method uses feedback on compressed line size to detect over-compression. The hardware implementation ensures faster response and hence better performance than the firmware implementation described above.

The process starts by clearing the register unused_bytes_accumulator (Step 2301). Referring again to the XGA example, to sustain transmission over a 525 Mbps channel, the targeted CR should be 2.16 (Step 2302). Therefore, ideally, each line should occupy a maximum of 1024*3/2.16=1423 bytes.

When transmission begins, the system selects Setting #4 which guarantees a worst-case CR=2.4 (Step 2303). This setting operates video rate control with 4:2:2 data, Lowpass CR=1 and Highpass CR=2, which imply that:

$$\text{max}L\text{size} = 1024*3*0.25/1.5 = 512 \text{ bytes}$$

$$\text{max}H\text{size} = 1024*3*0.75*0.5/1.5 = 768 \text{ bytes}$$

The first line is encoded using the specified maxLsize and maxHsize rate-control parameters (Step 2304), after which Lsize and Hsize represent the actual sizes of the lowpass and highpass subbands of the compressed line (Step 2305). In the present example, assuming Lsize=300 and Hsize=400 bytes:

$$(\text{max}L\text{size} + \text{max}H\text{size}) - (L\text{size} + H\text{size}) = 1280 - 700 = 580 \text{ bytes}$$

This indicates that the compressed line fell short of the maximum allowable size by 580 bytes. In other words, the line could have used 580 bytes more than it actually did, without violating the maximum of 1280 bytes associated with Setting #4. Therefore, in Step 2306, the system allocates these 580 unused bytes to the register unused_bytes_accumulator, so that they can be reclaimed by subsequent lines. Step 2307 clips unused_byte_accumulator to 32 Kbytes, using the clip function defined in FIG. 24.

Next, the system sets $\Delta_L$=256 bytes (Step 2308) and $\Delta_H$=368 bytes (Step 2309). Consequently, when the next line is encoded in Step 2304 the video rate control will allow it to use:

max$L$size+$\Delta_L$=512+256=768 bytes, for the lowpass subbands, and max$H$size+$\Delta_H$=768+368=1136 bytes for the highpass subbands Because the effective maximum line sizes for this line are increased by reclaiming a fraction of the unused bytes from preceding lines, video rate control may select less severe quantization settings for this line. This results in better visual quality.

The throughput limit of 525 Mbps is not violated over time because unused bytes are reclaimed from lines with CR greater than 2.4, resulting in instantaneous bandwidth requirements below 525 Mbps. These unused bytes are allocated to subsequent lines which may be compressed with lower CRs, resulting in instantaneous bandwidth requirements greater than 525 Mbps. However, the average bandwidth requirement is guaranteed to be lower than 525 Mbps because the system reclaims unused bytes that cause a line to be smaller than the allowable maximum size, maxLsize+maxHsize=1280 bytes. (Recall that 1280 bytes is smaller than the 1423 byte limit which guarantees the throughput of 525 Mbps.)

In practice, exceeding the bandwidth limit of 525 Mbps instantaneously on some lines is not a serious problem because the high-priority and low-priority packets are placed on a transmit buffer before transmission. A sufficiently large buffer may be drained at the constant rate of 525 Mbps without overflowing, provided that the average rate at which packets arrive does not exceed 525 Mbps.

The preceding explanation shows that instantaneous large bandwidth requirements will not result in buffer overflow if a sufficiently large transmit buffer is available. To reduce the cost associated with large buffers, an embodiment of the present invention uses the following techniques to prevent buffer overflow with a low-cost, moderately-sized buffer:

1) Setting #4 operates at CR=2.4 which corresponds to a throughput of 1132/2.4=472 Mbps. Therefore, the reclaimed bytes will cause bandwidth requirements which average to 472 Mbps, although instantaneously they may exceed 472 Mbps. However, it is quite unlikely that instantaneous bandwidth requirements will exceed 525 Mbps over a sustained period of time resulting in buffer overflow.
2) Step 2307 clips unused_byte_accumulator to 32 Kbytes, using the clip function defined in FIG. 24. By saturating this register to 32 Kbytes, an embodiment of the present invention places an upper bound on the number of consecutive lines that can reclaim unused bytes. Therefore, the number of consecutive lines with instantaneous bandwidth requirements exceeding 525 Mbps is upper-bounded. This reduces the probability of buffer overflow.
3) Steps 2308 and 2309 clip $\Delta_L$ and $\Delta_H$ to 256 bytes and 768 bytes respectively. This upper bounds the maximum compressed line size to maxLsize+256+maxHsize+768=2304 bytes, which corresponds to an instantaneous bandwidth requirement of 2304*8*768*60=849 Mbps. Because the instantaneous bandwidth requirement is upper bounded to 849 Mbps whenever it exceeds 525 Mbps, it is less likely to cause a buffer overflow.

The firmware and hardware methods described above cover visual quality improvements based on feedback regarding compressed packet or line size. However, other feedback can be used to react to changing channel conditions to prevent overflows in the transmit buffer that holds packets prior to wireless transmission.

If the receiver is requested to acknowledge all packets, unacknowledged packets can be re-transmitted. During re-transmissions, the setting index can be incremented to increase the CR and prevent buffer overflow because the transmit buffer does not drain during re-transmissions.

The WiMedia MAC specification (See "WiMedia MAC 0.99 RC1" by Multiband OFDM Alliance Special Interest Group, 2005) allows for negotiated time slots during which video transmission is disabled. Because these time slots are known in advance, the setting index can be incremented before, during and immediately after such time slots. Again, this action will prevent buffer overflow because the transmit buffer does not drain during disabled time slots.

Lastly, the setting index can be increased to prevent a buffer overflow whenever the buffer fullness exceeds a pre-defined threshold such as 65% of buffer capacity. When feedback regarding re-transmissions, disabled time slots and buffer fullness is absent, the rate-control method reverts to the previously described operation in which over-compression is detected and the setting index is decreased to increase PSNR while operating above the initial CR.

Although embodiments of the present disclosure have been described in detail, those skilled in the art should understand that they may make various changes, substitutions and alterations herein without departing from the spirit and scope of the present disclosure.

What is claimed is:

1. A method for line based video compression, comprising:
selecting a video format based on line of a video frame communicated between two nodes of said video frame;
selecting a wavelet transform based on said line of said video frame;
providing a low-pass portion and a high-pass portion of said line of said video frame based on said selected wavelet transform;
applying quantization parameters to said low-pass portion and to said high-pass portion of said line of said video frame to generate a quantized low-pass portion and a quantized high-pass portion; and
conditioning said quantized low-pass portion to fit an exponential distribution based on a low-pass portion of a previous line of said video frame.

2. The method of claim 1, further comprising encoding said conditioned low-pass portion and said quantized high-pass portion.

3. The method of claim 1 wherein said video format includes one of an RGB and a YUV format.

4. The method of claim 3 wherein said YUV format includes one of a 4:4:4, 4:2:2, and 4:1:1 format.

5. The method of claim 1 wherein selecting said wavelet transform includes selecting one of a Daubechies-(7,9), and LeGall-(5,3) wavelet transforms.

6. The method of claim 1 wherein selecting said wavelet transform includes selecting said wavelet transform based on an image compression standard.

7. The method of claim 2 wherein said encoding includes using an encoder that selectively switches between arithmetic coding and Golomb coding based on said active line of said video frame.

8. The method of claim 7 wherein encoding includes using a Golomb encoder implemented without arithmetic.

9. The method of claim 1 further comprising:
predicting a vertical edge in said high-pass portion;
obtaining a residual high-pass portion by suppressing said vertical edge in said high-pass portion; and
encoding said residual high-pass portion.

10. The method of claim 9 wherein predicting said vertical edge in said high-pass portion includes processing said low-pass portion with a vertical edge detector and wherein suppressing said vertical edge in said high-pass portion includes subtracting said predicted vertical edge from said high-pass portion.

11. The method of claim 1 further comprising:
generating at least one high-pass wavelet coefficient; and
generating at least one low-pass wavelet residual.

12. The method of claim 11 further comprising:
encoding at least one high-pass wavelet coefficient; and
encoding at least one low-pass wavelet residual.

13. The method of claim 12 wherein encoding said at least one high-pass wavelet coefficient includes Golomb encoding.

14. The method of claim 12 wherein encoding said at least one low-pass wavelet residual includes Golomb encoding.

15. A line based video compression apparatus, comprising:
means for selecting a video format based on a line of a video frame;
means for selecting a wavelet transform based on said line of said video frame;
means for providing a low-pass portion and a high-pass portion of said line of said video frame based on said selected wavelet transform;
means for applying quantization parameters to said low-pass portion and to said high-pass portion of said line of said video frame to generate a quantized low-pass portion and a quantized high-pass portion; and
means for conditioning said quantized low-pass portion to fit an exponential distribution based on a low-pass portion of a previous line of said video frame.

16. The apparatus of claim 15, further comprising means for encoding said conditioned low-pass portion and said quantized high-pass portion.

17. The apparatus of claim 16, wherein said means for encoding includes an encoder that selectively switches between arithmetic coding and Golomb coding based on said line of said video frame.

18. The apparatus of claim 15, wherein said video format includes one of an RGB and a YUV format.

19. The apparatus of claim 15, further comprising:
means for predicting a vertical edge in said high-pass portion;
means for obtaining a residual high-pass portion by suppressing said vertical edge in said high-pass portion; and
means for encoding said residual high-pass portion.

20. The apparatus of claim 15, further comprising:
means for generating at least one high-pass wavelet coefficient; and
means for generating at least one low-pass wavelet residual.

21. The apparatus of claim 20, further comprising:
means for encoding at least one high-pass wavelet coefficient; and
means for encoding at least one low-pass wavelet residual.

* * * * *